US007397935B2

(12) United States Patent
Kimmel et al.

(10) Patent No.: US 7,397,935 B2
(45) Date of Patent: Jul. 8, 2008

(54) METHOD FOR SEGMENTATION OF IVUS IMAGE SEQUENCES

(75) Inventors: Ron Kimmel, Haifa (IL); Yael Petrank, Haifa (IL); Oded Sudarsky, Haifa (IL); Avishav Sidlesky, Haifa (IL)

(73) Assignee: Mediguide Ltd., Haifa (IL)

( * ) Notice: Subject to any disclaimer, the term of this patent is extended or adjusted under 35 U.S.C. 154(b) by 493 days.

(21) Appl. No.: 10/843,221

(22) Filed: May 10, 2004

(65) Prior Publication Data

US 2005/0249391 A1 Nov. 10, 2005

(51) Int. Cl.
*G06K 9/00* (2006.01)
(52) U.S. Cl. ........................... 382/128; 382/190
(58) Field of Classification Search .......... 382/128, 382/130–133, 173, 190, 199; 600/424–427
See application file for complete search history.

(56) References Cited

U.S. PATENT DOCUMENTS

| 5,771,895 A | 6/1998 | Slager |
| 6,148,095 A | 11/2000 | Prause et al. |
| 6,152,878 A | 11/2000 | Nachtomy |

FOREIGN PATENT DOCUMENTS

GB 2326479 12/1998

OTHER PUBLICATIONS

Claus Dethlefsen et al., "A State-Space Model for a Sequence of Image Characteristics" Department of Mathematics, Institute of Electronics System, Aalborg University, Denmark.
L. Silveira Jr., et al., "Near Infrared Raman Spectroscopy for In Vitro Human Coronary Artery Tissue Identification", Universidade do Vale do Paraiba, Sao Paulo, Brazil.
Baris Sumengen et al., "Image Segmentation Using Curve Evolution", Department of Electrical and Computer Engineering, University of California, Santa Barbara, CA 93106-9560.
International Search Report and Written Opinion for PCT/IL2005/000417 (claiming priority from U.S. Appl. No. 10/843,221).

*Primary Examiner*—Duy M Dang
(74) *Attorney, Agent, or Firm*—Darby & Darby PC

(57) ABSTRACT

Method for performing segmentation of an interior vessel within the body of a patient, the method including obtaining a sequence of intravascular ultrasound images of an interior vessel and dividing the sequence into batches, detecting uninformative regions in each of the batches, the uninformative regions arising from an acoustic shadow cast by guide wire and by calcified plaque within the interior vessel, extracting a preliminary outer boundary of the interior vessel, tracking images in each of the batches to counter various distortions, performing statistical analysis and spatial integration on each of the batches to obtain a classification of blood and tissue regions, extracting a secondary outer boundary of the interior vessel utilizing the classification of blood and tissue regions and refining result, and extracting the inner boundary of the interior vessel based on the classification of blood and tissue regions.

79 Claims, 11 Drawing Sheets

202  206           204  208

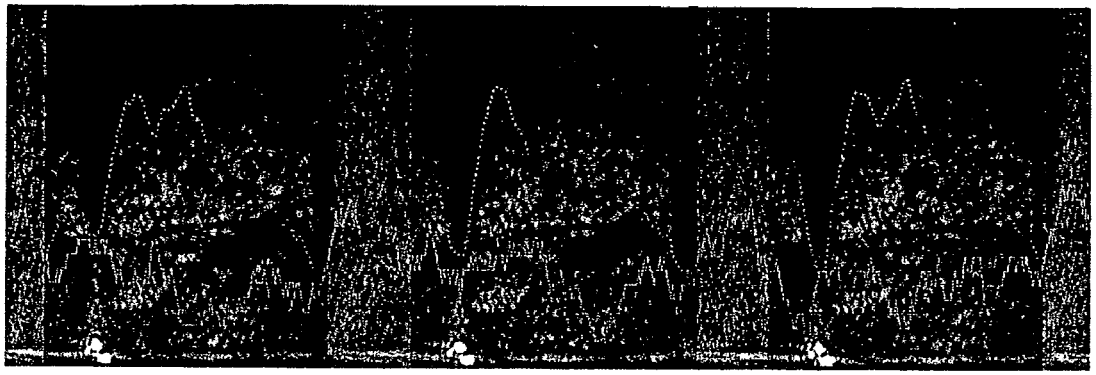
FIG. 13A
---- UNSMOOTHED DETECTED OUTER BOUNDARY
........... AVERAGE INTENSITY
———— NUMBER OF GRAY LEVEL PEAKS
BIFURCATION SECTORS MARKED IN GREY
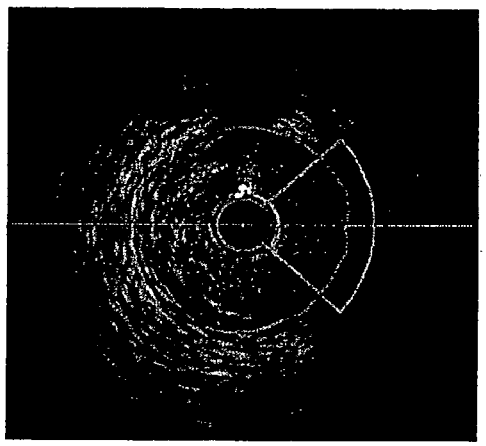 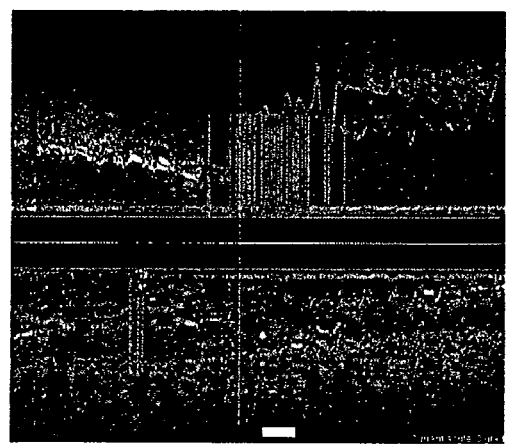
FIG. 13B   FIG. 13C
———— DETECTED OUTER BOUNDARY
......... IVUS IMAGE & LONGITUDINAL-SECTION CORRELATION MARKERS
———— BIFURCATION SECTORS IN IVUS IMAGE & LONGITUDINAL-SECTION
   (RADIAL DIMENSION HAS NO SIGNIFICANCE)

METHOD FOR SEGMENTATION OF IVUS IMAGE SEQUENCES

FIELD OF THE DISCLOSED TECHNIQUE

The disclosed technique relates to medical image processing in general, and to a method for performing quantitative analysis of a coronary artery, in particular.

BACKGROUND OF THE DISCLOSED TECHNIQUE

Techniques for obtaining intravascular ultrasound (IVUS) images of an interior vessel in the body, such as a coronary artery, are known in the art. Generally, a catheter including an ultrasound apparatus is introduced into the vessel. As the catheter is gradually moved along the vessel, the ultrasound apparatus transmits ultrasonic signals and detects the reflected signals. A processing device derives an image based on the detected ultrasound signals. In this manner, a sequence of images of the interior structure of the vessel is obtained. However the image sequence by itself does not reveal or identify the exact position of different features of the vessel. For example, with such images of a coronary artery, it is difficult to distinguish between areas of blood and tissue, and regions of calcium deposits. This information can assist and enhance the performance of medical operations, including various types of diagnostic, therapeutic, and preventative procedures.

U.S. Pat. No. 5,771,895 to Slager entitled "Catheter for obtaining three-dimensional reconstruction of a vascular lumen and wall", is directed to a catheter system and method for obtaining three-dimensional reconstruction of a vessel by X-ray angiography and intravascular ultrasound. A catheter is pulled back through a blood vessel at a certain speed. The catheter system includes an elongated sheath having proximal and distal regions. The distal region houses an ultrasound transducer and permits rotation and longitudinal translation. The transducer captures a stack of cross-sectional ultrasound images during pull-back. A sequence of radiopaque markers is disposed along the sheath, equally spaced. The markers speed up the three-dimensional reconstruction of the catheter centerline, and may also provide positional feedback during pull-back.

A computer program detects the contours of the luminal and wall-adventitia boundaries at fixed intervals, based on end diastolic samples of the IVUS images. Biplane fluoroscopy records the start and end of the pull-back, and biplane angiography is performed without changes in geometrical X-ray settings. The geometry of the longitudinal centerline, representing the path of the IVUS transducer, is determined using the biplane fluoroscopy image data. A three-dimensional reconstruction of the vessel is made using the IVUS data stack, the catheter path, and the lumen contours. In particular, the contours are combined with the centerline using features of the angiograms, such as the position of the centerline relative to the lumen border, to establish the rotational position of the contours around the spatial curve.

U.S. Pat. No. 6,152,878 to Nachtomy et al entitled "Intravascular ultrasound enhanced image and signal processing", is directed to a device and method for processing intravascular ultrasound image information to remove distortions and inaccuracies caused by various types of motion in the catheter and the bodily lumen. A transducer attached to a catheter emits and receives ultrasonic signals. The catheter is inserted into a blood vessel. An ultrasound beam from the transducer is continuously rotated within the vessel, forming a 360° internal cross-sectional image in a transverse plane of the vessel. The catheter is gradually moved along the blood vessel, and images of various segments of the vessel are obtained.

The detected ultrasound signal is processed to form a set of vectors comprising digitized data. Each vector represents the ultrasonic response of a different angular sector of the vessel. The digitized vectors are initially stored in a matrix in polar coordinate form. The polar matrix is converted into a matrix in Cartesian coordinate form, in which the axes correspond to the Cartesian representation of the cross-section of the vessel. The image is then further processed and transferred to a display.

The images are stabilized in order to compensate for different types of relative motion experienced by the catheter and the vessel. These types of motion include: rotation in the plane of the image, Cartesian displacement, global vasomotion or a radial contraction and expansion of the entire vessel, local vasomotion or a radial contraction and expansion of different parts of the vessel with different magnitudes and directions, local motion by different tissue, and through plane motion or movements perpendicular to the plane of the image.

The first three types of motion are stabilized using global stabilization, which compare whole parts of the image to one another. The next two types of motions in the list are stabilized by applying closeness operations on a localized basis. The last type of motion is stabilized using cardiovascular periodicity detection.

In global stabilization, shift evaluation is performed using a closeness operation. A first image is transformed and its closeness to its predecessor second image is measured. The transformation is performed by shifting the entire first image along a combination of axes. The images are then compared using a predefined function. The transformation is repeated until all shifts are measured and the global extremum of the comparisons indicates the direction and magnitude of the movement between the two images.

"A State-Space Model for a Sequence of Image Characterisitics" by Dethlefsen, Hansen, and Lundbye-Christensen, discusses an automated method for determining the evolution of the cross-sectional area of a coronary artery. A sequence of images of the coronary artery is obtained through ultrasound imaging. The artery wall is modeled as a pulsating disc parameterized by a center and a radius. The center and radius may both exhibit fluctuations due to random factors. The cross-sectional area of the artery can be calculated at a given time from estimates of the center and the radius. The vector of image characteristics is estimated at any given time by utilizing the series of images previously observed and calculating the posterior mean and variance matrices. In order to obtain the series of posterior means, the recursive structure of the Kalman filter is combined with a Markov chain Monte Carlo method, such as the Metropolis-Hasting's algorithm.

"Near-Infrared Raman Spectroscopy for In Vitro Human Coronary Artery Tissue Identification" by Silveira Jr, Zângaro, Pacheco, Sathaiah, Chavantes, and Pasqualucci, discusses the use of Near-infrared Raman Spectroscopy for in vitro diagnosis of atheromatous plaque. An algorithm is presented that classifies the human coronary artery segments into two segments: non-pathologic (NP) or atherosclerotic (AT) plaque, based on spectral features extracted from Raman data. The classification is done using Mahalanobis distance using histopathological results as a gold standard.

A collection of coronary artery fragments are extracted and prepared. The samples are placed before the spectrograph of the NIRS and spectral data is obtained. The fragments are classified in four main tissue types by a pathologist. The spectra are separated according to histopathology, plotted, and spectral features obtained. The atheromatous plaque exhibited distinct Raman features, such as main bands at specific wavelengths, and a higher relative intensity. Different features of the spectra are used in classifying the spectra into two categories. For a clear separation into groups, separation surfaces are drawn based on the Mahalanobis distances, which takes into account the relative distance between the sample to the mean of a group as well as the covariance matrix of the data.

SUMMARY OF THE PRESENT DISCLOSED TECHNIQUE

It is an object of the disclosed technique to provide a novel method for performing quantitative analysis of a coronary artery, which overcomes the disadvantages of the prior art.

In accordance with the disclosed technique, there is thus provided a method for performing segmentation of an interior vessel within the body of a patient. The method includes the procedures of obtaining a sequence of IVUS images of an interior vessel and dividing the sequence into batches, detecting uninformative regions in each of the batches, the uninformative regions arising from an acoustic shadow cast by guide wire and by calcified plaque within the interior vessel, extracting a preliminary outer boundary of the interior vessel, tracking images in each of the batches to counter various distortions, performing statistical analysis and spatial integration on each of the batches to obtain a classification of blood and tissue regions, extracting a secondary outer boundary of the interior vessel utilizing the classification of blood and tissue regions and refining the result, and extracting the inner boundary of the interior vessel based on the classification of blood and tissue regions. According to one embodiment, the interior vessel is a coronary artery.

The classification of blood and tissue regions is based on the presence or absence of blood speckle in the images. Statistical analysis and spatial integration involves calculating statistical properties relating to the intensities of a pixel over a series of images. The statistical properties are calculated for pixel coordinates that are shifted between the images. The statistical properties are learned from images where the inner and outer boundaries have been manually traced by a user. The statistical analysis and spatial integration are performed inside the extracted preliminary outer boundary and excluding the detected uninformative regions. The statistical analysis and spatial integration are also performed on temporally sub-sampled images.

The method may further include the procedures of scaling down the sequence of IVUS images, and scaling up the extracted secondary outer boundary and the extracted inner boundary. The method may further include the procedure of detecting stents in each of the batches and determining the borders of the stents in the sequence of IVUS images. The method may further include the procedure of performing roll stabilization on the sequence of IVUS images. The method may further include the procedure of estimating roll offsets between each pair of consecutive images in each of the batches, and accumulating the roll offsets in the sequence of IVUS images. The method may further include the procedure of identifying bifurcation sectors in each of the batches and computing bifurcation regions in the sequence of IVUS images. The method may further include the procedure of manually editing the segmentation output in selected images by a user. The method may further include the procedure of displaying the segmentation output with respect to level of confidence measures.

BRIEF DESCRIPTION OF THE DRAWINGS

The disclosed technique will be understood and appreciated more fully from the following detailed description taken in conjunction with the drawings in which:

FIG. 13A is a series of three IVUS images in polar coordinates demonstrating valid bifurcation sectors;

FIG. 13B is the middle IVUS image of FIG. 13A in Cartesian coordinates demonstrating a valid bifurcation sector; and FIG. 13C is a longitudinal section at an angle of 0° of an entire IVUS image sequence, centered on the IVUS image of FIG. 13B.

DETAILED DESCRIPTION OF THE EMBODIMENTS

The disclosed technique overcomes the disadvantages of the prior art by providing a method that identifies different features of an interior vessel within a sequence of IVUS images of the vessel. In particular, the method detects the inner (luminal) and outer (medial-adventitial) boundaries of the vessel, and calcium deposits in the plaque region between the inner and outer boundaries. The term "segmentation" refers to the identification of these features. The method calculates temporal statistics, primarily average intensity and total variation parameters, based on which pixels are classified as either blood or tissue. The inner boundary of the vessel is extracted from the blood/tissue classification. The outer boundary of the vessel is detected by dynamic programming. A manual trace performed by a user provides parameter inputs in a "learning system" for the method.

In accordance with the disclosed technique, the method may further include procedures for stabilizing an IVUS image sequence and eliminating uninformative regions, which are performed preliminary to the segmentation. These preliminary procedures provide better input for the core analysis procedures of the method. Stabilization involves eliminating various distortions and transformations in the image sequence. These distortions may be caused by cyclic motion within the blood vessel, such as the cardiac pulse cycle. Uninformative regions in the image sequence correspond to areas where an acoustic shadow is cast by the guide wire and by regions of calcified plaque within the blood vessel, resulting in the information in that area being unreliable for analysis purposes.

It is noted that the terms "outer boundary" and "external elastic membrane (EEM)" are used interchangeably herein. The results of the method can be utilized in the reconstruction of a three-dimensional model of the coronary artery. This information can assist and enhance the performance of medical operations, including various types of diagnostic, therapeutic, and preventative procedures. Possible applications include intra-body navigation, and tracking an invasive device during minimally invasive surgery. The results of the method may also be clinically important and applied to the diagnosis and treatment of different conditions relating to the coronary artery of a patient. It is noted that the disclosed technique is applicable to the segmentation of any type of blood vessel in the body of a patient, including different arteries and veins. The following includes a description of the disclosed technique used, for example, within a coronary artery.

Figure 1:
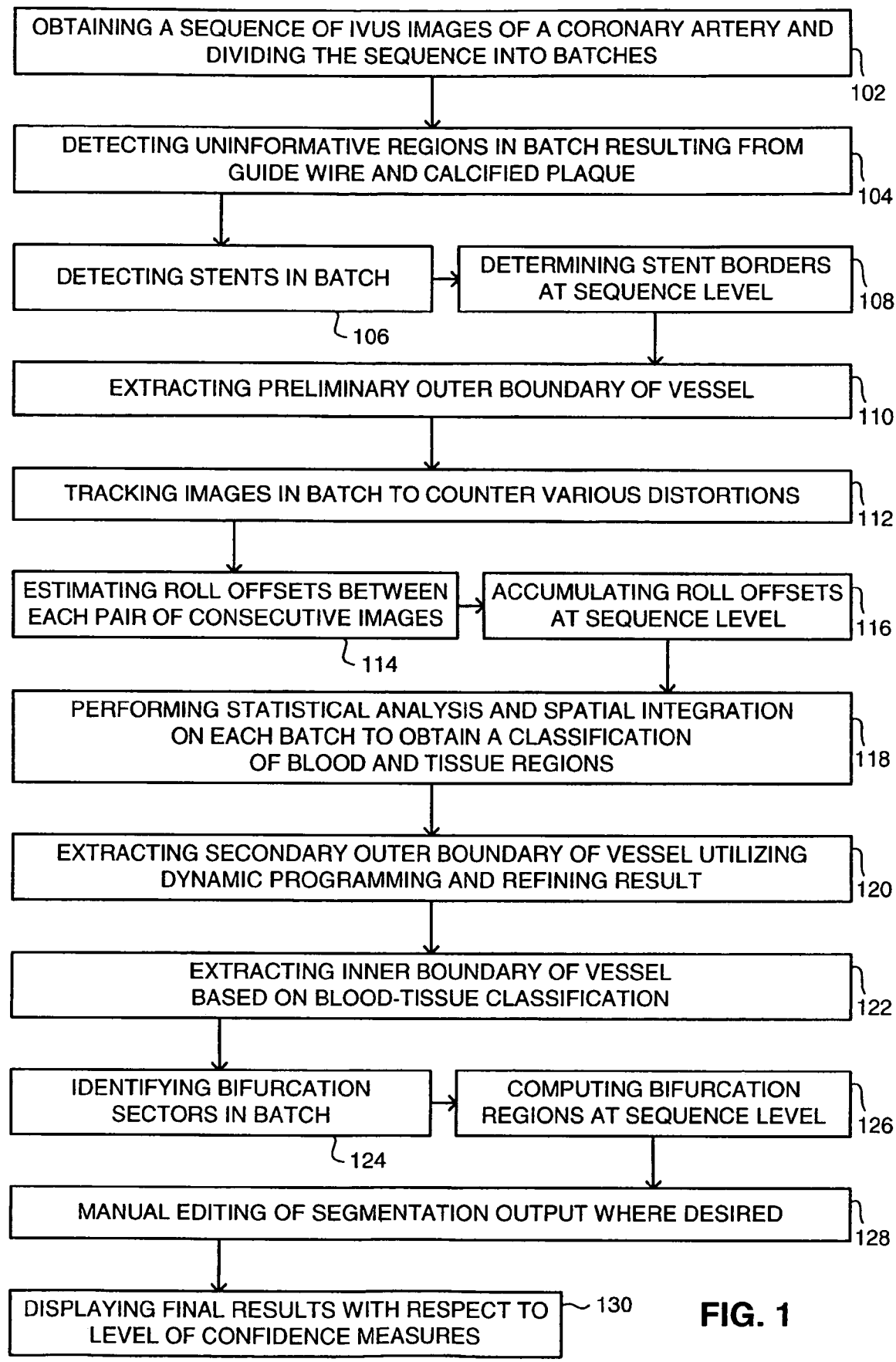
FIG. 1 is a block diagram of a method for performing segmentation of a coronary artery, operative in accordance with an embodiment of the disclosed technique.

Reference is now made to FIG. 1, which is a block diagram of a method for performing segmentation of a coronary artery, operative in accordance with an embodiment of the disclosed technique.

In procedure 102, a sequence of IVUS images of a coronary artery of a patient is obtained. The images are obtained via an IVUS imaging device, such as an ultrasound apparatus mounted on a catheter, which captures images as it is guided through the artery, as is known in the art. A Medical Positioning System (MPS) is used in conjunction with the imaging device to obtain position and orientation information relating to the captured image. The image sequence is divided into batches of images, each batch being processed independently. Accordingly, multi-processing can be applied to several batches concurrently, resulting in a more efficient overall computation. It is noted that while the majority of processing is performed on each batch independently, there are certain aspects where several batches must be operated upon together, i.e., that involve additional processing at a sequence level. The batches are typically on the order of a hundred image frames, although other batch sizes may be used as well.

In an optional procedure (not shown), the images in each batch are scaled down. Scaling down involves reducing the size and complexity of the input images, allowing a system with limited computing resources to enhance performance (e.g., to operate in real-time). Scaling down may be implemented by any technique that reduces the resolution of the original image, such as decimation (i.e., sampling every other pixel in each dimension of an image frame). Additionally, in the subsequent statistical analysis procedure, series of pixel intensities can be constructed, and statistics for these series calculated, for only a sub-sample of the reduced-resolution images. The terms "scaling down" and "spatial sub-sampling" are used interchangeably herein.

If the images are scaled down, the segmentation output will need to undergo a corresponding scaling up, to restore the original size.

In one embodiment of the disclosed technique, roll stabilization is performed on the IVUS image sequence obtained in procedure 102. Roll stabilization involves adjusting the images with respect to the repetitive, back and forth, rolling motion of the images around the center of the catheter. This motion is caused by the cardiac pulse cycle of the patient, as a result of activity of the heart, such as systole and diastole. The cardiac pulse cycle affects the artery in a certain way, such as contraction or expansion in varying degrees and at periodic intervals. For example, the artery may rotate one way during systole, and rotate the other way during diastole. The rolling motion may also result from other factors, such as the stiffness of the catheter with respect to the artery. As well, the twisting or bending shape of the artery, which may be straighter in certain sections than in others, may affect the rolling motion of the images during the cardiac cycle.

A counter-transformation is applied to the images to counter the effect of the repetitive rolling motion exhibited by the artery. Roll stabilization involves finding and applying correspondences in the angular direction between consecutive images. In particular, a variant of the Kanade-Lucas algorithm is applied (B. D. Lucas and T. Kanade, "*An iterative image registration technique with an application to stereo vision.*" Proc. DARPA Image Understanding Workshop, Washington, D.C., April 1981, pp. 121-130; Proc. 7th Intl. Joint Conf. Artificial Intelligence (IJCAI), Vancouver, BC, August 1981, pp. 674-679). It is noted that in a further embodiment of the disclosed technique, the procedure of roll stabilization is not performed. Instead, roll offsets are estimated, as elaborated upon later on with reference to procedures 114 and 116.

For the purposes of the following discussion, it is assumed that the IVUS image sequence is in polar coordinate form. In polar coordinates, the rolling motion is expressed as a repetitive, cyclic, horizontal translation (assuming the horizontal axis is associated with the angle $\theta$).

The result of roll stabilization is that the angular orientation (i.e., roll) of every image in the sequence matches a single reference image, such as the first image in the sequence. This is reasonable because the input IVUS images are not given in any particular angular orientation (e.g., the pectoral direction at 12 o'clock and the dorsal at 6 o'clock), and the orientation is usually unknown. Hence, the orientation can be chosen to suit the needs. Furthermore, the change of orientation is bounded by 180 degrees (clockwise or counter-clockwise).

In procedure 104, uninformative regions are detected within the images of each batch. These uninformative regions result from an "acoustic shadow" cast by the guide wire attached to the catheter, as well as by calcified plaque which accumulates in the interior of the artery. Acoustic shadow refers to an area in which the ultrasound beam cannot penetrate and as a result no imaging information can be obtained. As a result, the ultrasound information in the image sector directly beyond the guide wire and the calcified plaque is unreliable.

Figure 2A:
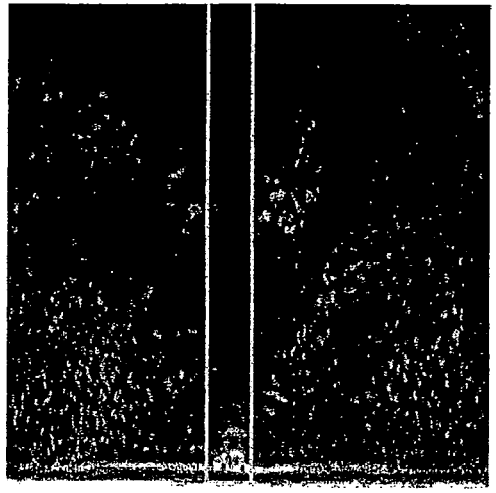
FIG. 2A is an IVUS image in polar coordinates of a coronary artery with lines demarcating the region affected by the acoustic shadow of the guide wire.
Figure 2B:
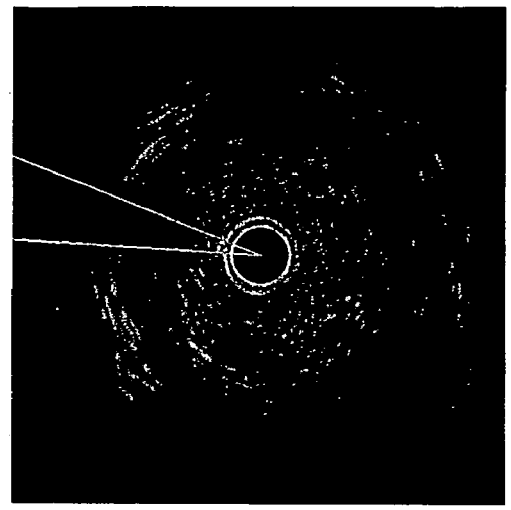
FIG. 2B is an IVUS image in Cartesian coordinates of a coronary artery with lines demarcating the region affected by the acoustic shadow of the guide wire.

The guide wire is usually located outside the catheter sheath, alongside the imaging device. The guide wire is usually clearly visible in the IVUS images as a very bright patch, usually close to the catheter. The guide wire casts an acoustic shadow on the image area immediately above the guide wire. The region affected by the guide wire is a vertical band in polar coordinates, and a sector in Cartesian coordinates. Reference is made to FIGS. 2A and 2B. FIG. 2A is an IVUS image in polar coordinates of a coronary artery with lines demarcating the region affected by the acoustic shadow of the guide wire. FIG. 2B is an IVUS image in Cartesian coordinates of a coronary artery with lines demarcating the region affected by the acoustic shadow of the guide wire.

A similar phenomenon occurs with regard to calcified plaque. Relatively old plaque becomes "calcified", meaning that the plaque acquires a calcium deposit. Calcium shows up bright in ultrasound, and is echo-opaque (i.e., the calcium casts an acoustic shadow). Thus, the IVUS appearance of calcified plaque is similar to that of the guide wire. Both appear bright with a dark region beyond. Like the guide wire, calcified plaques are detrimental to the reliable detection of the area beyond them. But there are several differences between the two. There may be several areas of calcified plaque, whereas there is only a single guide wire on the catheter. Also, calcified plaque is wider than the guide wire. As well, the guide wire is usually close to the catheter, unlike calcified plaque. Finally, calcified plaque influences only EEM detection, whereas the guide wire affects the detection of both boundaries.

Figure 3A:
FIG. 3A is an IVUS image in polar coordinates of a coronary artery with lines demarcating the region affected by the acoustic shadow of the calcified plaque.
Figure 3B:
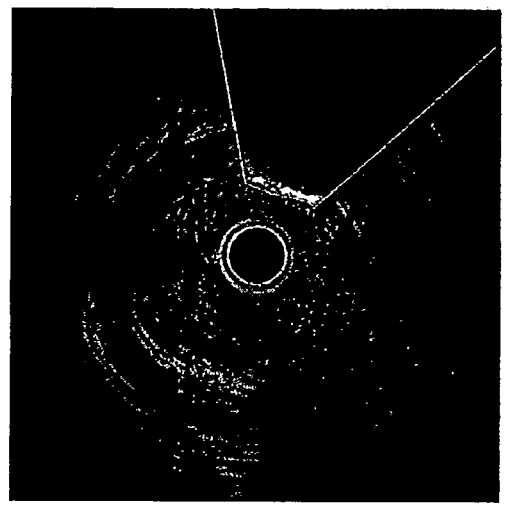
FIG. 3B is an IVUS image in Cartesian coordinates of a coronary artery with lines demarcating the region affected by the acoustic shadow of the calcified plaque.

Calcified plaque is generally detected by finding high-intensity pixels having a very low mean intensity above them. The detection of calcified plaque allows the EEM to be found more accurately by ignoring image data in the shadow of the plaque. In effect, the EEM is interpolated in the shadow region from the regions outside the shadow. Thus regions of calcified plaque in the images are identified to further assist with subsequent boundary detection. Calcified plaque is also clinically important per se. Reference is made to FIGS. 3A and 3B. FIG. 3A is an IVUS image in polar coordinates of a coronary artery with lines demarcating the region affected by the acoustic shadow of the calcified plaque. FIG. 3B is an IVUS image in Cartesian coordinates of a coronary artery with lines demarcating the region affected by the acoustic shadow of the calcified plaque.

Figure 4:
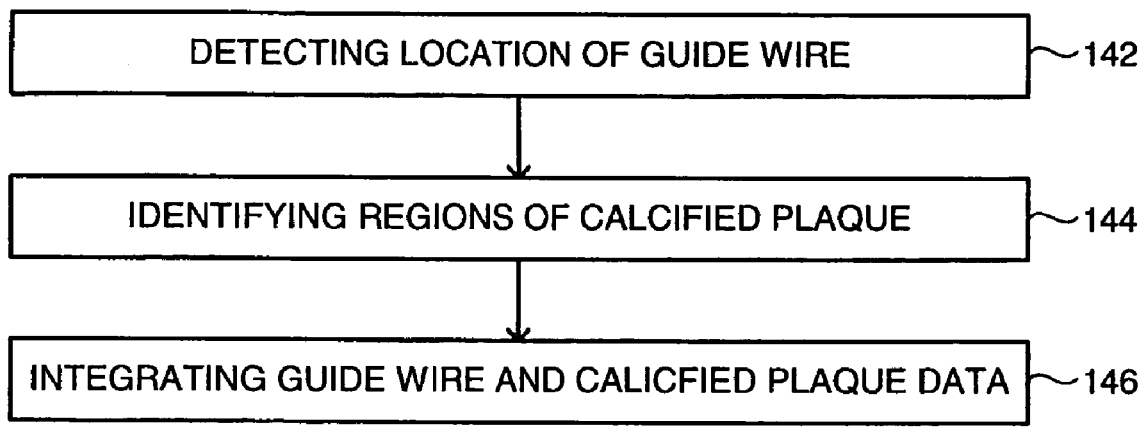
FIG. 4 is a block diagram of a method for detecting uninformative regions within the images of a batch, resulting from the guide wire and calcified plaque, operative in accordance with an embodiment of the disclosed technique.

Reference is now made to FIG. 4, which is a block diagram of a method for detecting uninformative regions within the images of a batch, resulting from the guide wire and calcified plaque, operative in accordance with an embodiment of the disclosed technique. The IVUS image sequence is assumed to be in polar coordinates throughout the following description. Furthermore, the column coordinate (polar θ coordinate) is treated as cyclic where images are processed independently.

Figure 5:
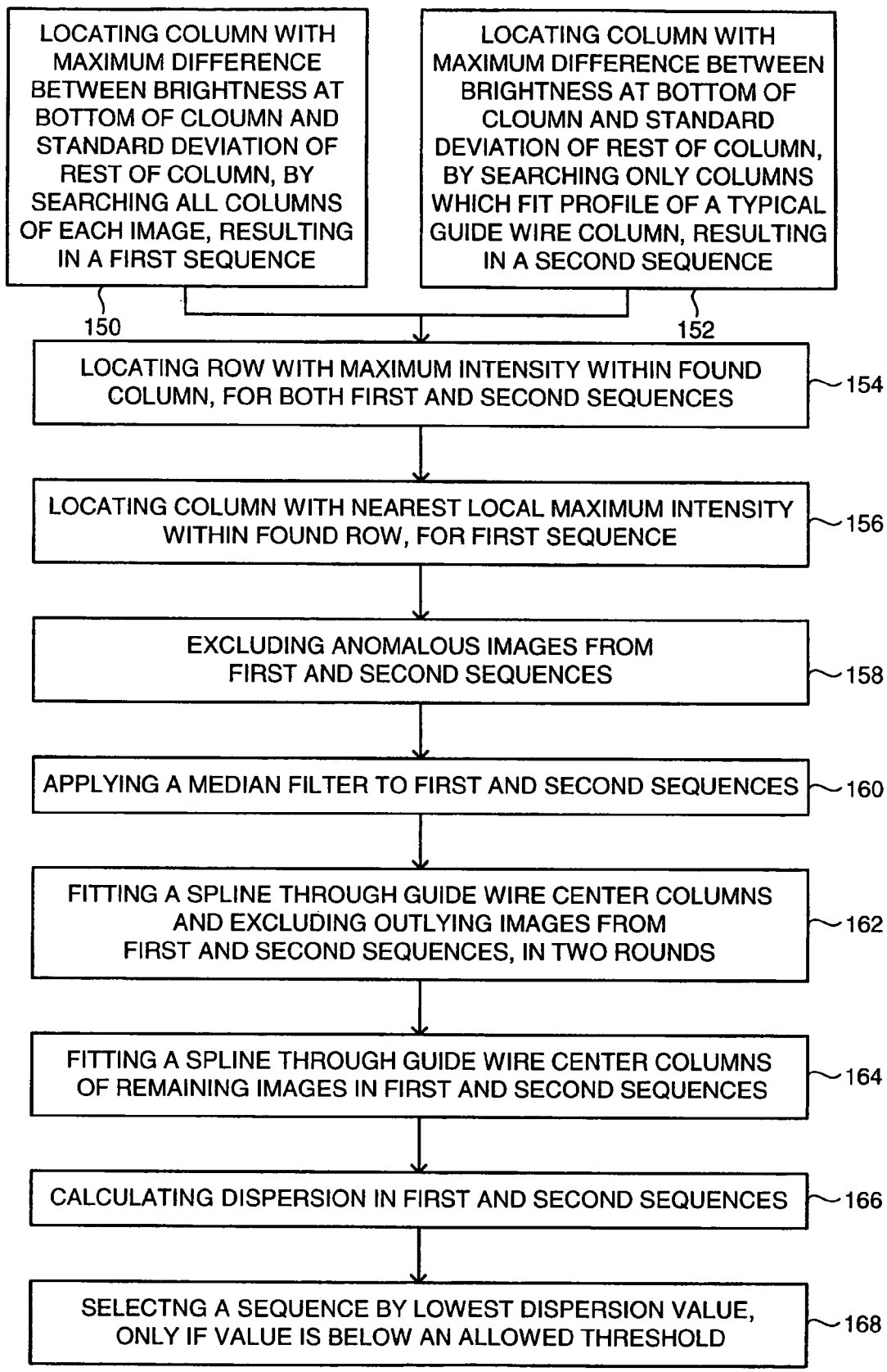
FIG. 5 is a block diagram of a method for detecting the location of the guide wire in an IVUS image sequence, operative in accordance with an embodiment of the disclosed technique.

In procedure 142, the location of the guide wire is detected. Reference is now made to FIG. 5, which is a block diagram of a method for detecting the location of the guide wire in an IVUS image sequence, operative in accordance with an embodiment of the disclosed technique.

In procedure 150, the column with a maximum difference between the brightness at the bottom of the column and the standard deviation of the rest of the column is located for each image in the sequence, by searching all the columns in each image. The bottom of the column is the area closest to the catheter, where the guide wire is most likely located. Columns affected by the guide wire exhibit a high brightness near the bottom and a low standard deviation. Thus, the difference between the two is effectively an equal-weight combination of both conditions. A first sequence of columns is obtained in procedure 150. It is noted that since the IVUS image sequence is provided in polar coordinates, a column in a given image corresponds to a radial ray, whereas a row corresponds to a fixed radial distance.

In procedure 152, the column with a maximum difference between the brightness at the bottom of the column and the standard deviation of the rest of the column is located for each image in the sequence. Only columns which fit the profile of a typical guide wire column, by exhibiting specific gray level ranges and standard deviations in different parts of the column, are searched. It is noted that in some cases, there may not be columns fitting the typical profile in every image. A second sequence of columns is obtained in procedure 152.

In procedure 154, the row with maximum intensity is located within the column found in procedure 152, for both the first sequence and the second sequence. This row is likely to be in the guide wire itself, rather than in its acoustic shadow.

In procedure 156, the column with the nearest local maximum intensity is located within the row found in procedure 152. This is performed only for the columns in the first sequence. The row found in procedure 154 together with the column found in procedure 156 represents the coordinate of the center of the guide wire. The intensity and standard deviation can actually be slightly higher at the center of the shadow of the guide wire than at at the edges of the guide wire, due to interference effects. As a result, the column found in procedure 152 may be off-center, whereas the column found in procedure 156 corresponds to the true center.

In procedure 158, anomalous images are excluded from the first sequence and the second sequence of guide wire columns. This applies to the second sequence, only if procedure 152 yielded a number of samples higher than a threshold. These anomalous images include images which do not smoothly conform to the current sequence of images (e.g., images with an outlying guide wire row coordinate, intensity, or any of several other characteristics).

In procedure 160, a median filter is applied to the first sequence and the second sequence. This applies to the second sequence, only if procedure 152 yielded a number of samples higher than a threshold.

In procedure 162, a spline is fitted through the guide wire center columns of the first sequence and the second sequence. This applies to the second sequence, only if procedure 152 yielded a number of samples higher than a threshold. The stored data is the image number in the sequence together with the location of the guide wire center in that image. Images with an outlying distance between shadow edge column and the interpolated spline are excluded from the sequences. These steps are repeated in a second round. A spline is again fitted through the remaining guide wire center columns of the sequences, and images with an outlying distance between shadow edge column and the interpolated spline are excluded.

In procedure 164, a spline is yet again fitted through the guide wire center columns of the remaining images (after procedure 162) in the first sequence and the second sequence. This applies to the second sequence, only if procedure 152 yielded a number of samples higher than a threshold.

In procedure 166, the dispersion is calculated in the first sequence and the second sequence. This applies to the second sequence, only if procedure 152 yielded a number of samples higher than a threshold. In order to calculate the dispersion, or the width of the acoustic shadow of the guide wire, two columns are searched for, to the left and right of the guide wire center column (represented by the spline fitted in procedure 164), where the standard deviation attains some fraction (e.g., 0.8) of the average of standard deviations of all the columns of that image. The vertical band between these two columns represents the acoustic shadow cast by the guide wire. Alternatively, the width can be set to a predetermined constant.

Finally in procedure 168, one of the resulting first sequence and second sequence is selected. If only the first sequence exists, it is selected if the dispersion of the first sequence is smaller than a threshold value. If both sequences exist, then the sequence with the smallest dispersion is chosen, if this dispersion is below a threshold value.

It is noted that if guide wire detection is performed on roll stabilized images, the guide wire is searched for in a sample of the batch frames (e.g., every 5-10 frames) whereas if guide wire detection is performed on unstabilized images (when roll offsets are to be calculated), the guide wire is searched for in all the frames of the batch (although searching in a sample of frames in this case is also a possibility).

Figure 6:
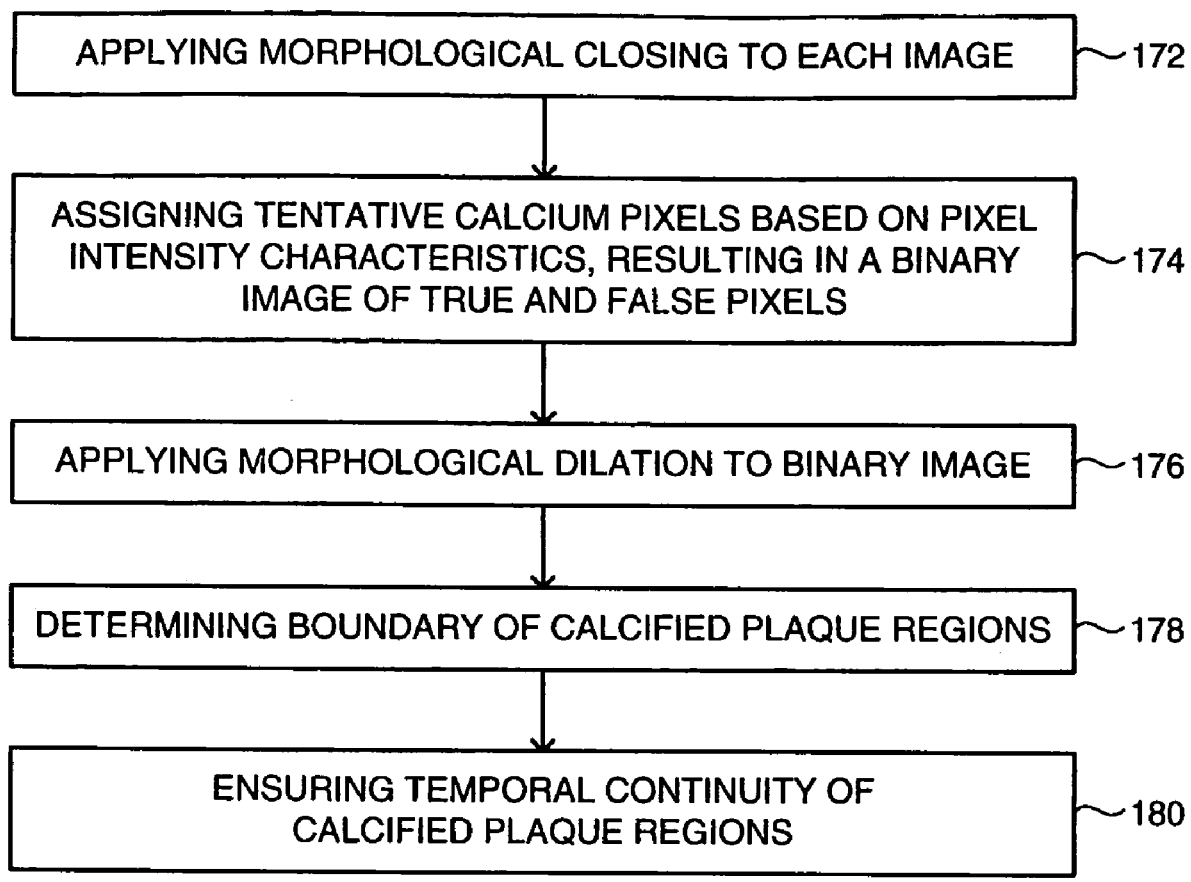
FIG. 6 is a block diagram of a method for identifying regions of calcified plaque in an IVUS image sequence, operative in accordance with an embodiment of the disclosed technique.

Referring back to FIG. 4, in procedure 144, regions of calcified plaque are identified within the images of a batch. Reference is now made to FIG. 6, which is a block diagram of a method for identifying regions of calcified plaque in an IVUS image sequence, operative in accordance with an embodiment of the disclosed technique. The images are assumed to be in polar coordinates throughout the following description.

In procedure 172, a continuous morphological closing operation is applied to each polar image. The morphological closing operator, which involves dilation followed by erosion, eliminates the gaps between the "true" pixels. The structuring element of both dilation and erosion is a circle, with a radius appropriate to the distance between "true" pixel clusters in the images. A possible implementation of the dilation and erosion is to simply compare a distance map of the "true" pixels to the radius of the circular structuring element. The distance map is calculated via Danielsson's algorithm, slightly modified for cyclicity in the horizontal ($\theta$) direction.

In procedure 174, a tentative assignment of calcium pixels is made for each image based on pixel intensity characteristics. In particular, a pixel is assigned "true" (i.e., a calcified plaque pixel) if and only if the intensity of the pixel in the morphologically closed image is high (above a threshold value), and the mean intensity of the pixels above the pixel in the original image is low (below a threshold value). This procedure results in a binary image of "true" and "false" pixels.

In procedure 176, a morphological dilation operation is applied to the binary image. Dilation is performed by comparing a distance map of the "true" pixels to the radius of a circular structuring element, as described earlier.

In procedure 178, the boundary of the calcified plaque regions is determined. The boundary is determined by finding, in each column, the row number of the lowest "true" pixel in the dilated binary image. The lowest "true" pixel represents the pixel which is closest to the catheter. If there is no plaque in a column, a value of zero is assigned.

In procedure 180, temporal continuity is ensured for the detected regions of calcified plaque. A series of fifteen consecutive images are examined, and a plaque row is assigned to each column of the image in the center of the series. For each column, if calcium was detected in less than three of the images, then zero is assigned, indicating no calcium. Otherwise, the assigned value is the minimum of the non-zero plaque rows for that column in the image series.

Referring back to FIG. 4, in procedure 146, integration is performed between the data involving the guide wire and the data involving the regions of calcified plaque. The integration algorithm is directed to verify whether the guide wire was falsely identified as calcium. If indeed this occurred, the calcium and guide wire data are updated. This algorithm has no effect on the identification of the inner and outer boundaries of the algorithm, but helps to achieve a more accurate estimation of the amount of calcified plaque.

The integration is performed as follows. The image batch is assumed to be in polar coordinates throughout the following description.

Initially, it is confirmed that both the guide wire and calcium exist in a given image. Then, for each image in which both the guide wire and calcium exist, a comparison is made between the calcium data and the guide wire data to determine if the two coincide. If indeed the guide wire data and calcium data overlap, and if the width and row of the calcium section in the overlapping region may fit the width of a guide wire shadow and the row of the guide wire tip, then it is concluded that the guide wire was falsely identified as calcified plaque. The falsely identified calcified plaque is then erased from the calcium data, and if necessary, the width of the guide wire shadow is updated.

Referring back to FIG. 1, in procedures 106 and 108, stents are detected. A "stent" refers to an open tubular structure, typically made of solid material (e.g., metal, plastic, ceramics, and the like), which is inserted into an interior vessel such as an artery to keep the lumen open and prevent closure due to stricture or external compression. Since a single stent can span several batches, this task is divided into batch-level processing (procedure 106) and sequence-level processing (procedure 108). A stent strut typically appears on the IVUS images as several patches, each patch made up of a few pixels of high intensity.

Figure 7:
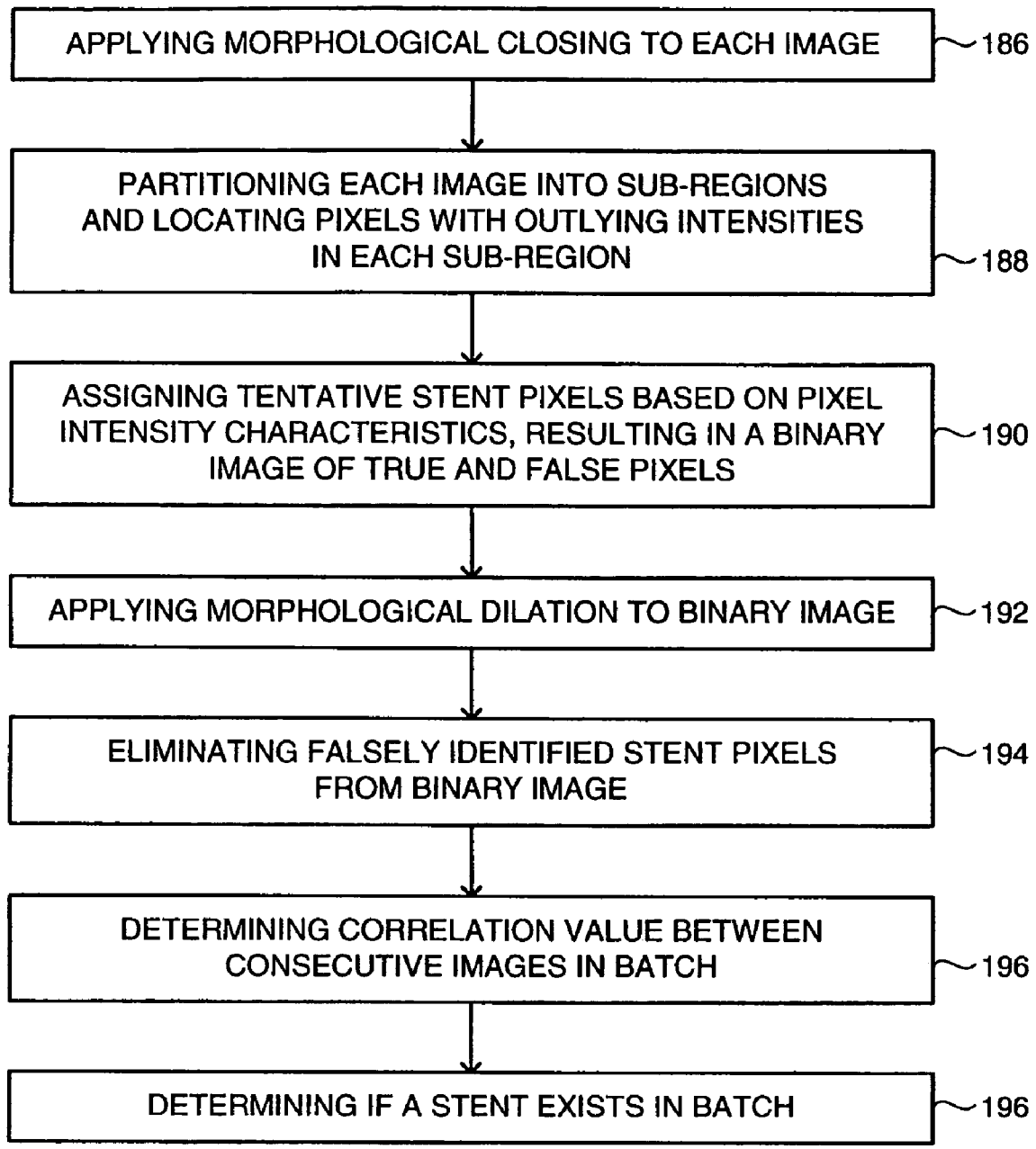
FIG. 7, which is a block diagram of a method for detecting stents in an IVUS image batch, operative in accordance with an embodiment of the disclosed technique.

Reference is now made to FIG. 7, which is a block diagram of a method for detecting stents in an IVUS image batch, operative in accordance with an embodiment of the disclosed technique. The images are assumed to be in polar coordinates throughout the following description.

In procedure 186, a continuous morphological closing operation is applied to each polar image. Procedure 186 is analogous to procedure 172 with reference to FIG. 6. Following the morphological closing operation, each image is smoothed by applying an appropriate filter. In procedure 188, each image is partitioned into sub-regions, and pixels with outlying intensities are located in each sub-region.

In procedure 190, a tentative assignment of stent pixels is made for each image based on pixel intensity characteristics. In particular, a pixel is assigned "true" (i.e., a stent pixel) if and only if the intensity of the pixel in the morphologically closed image is high (above a threshold value), and the mean intensity of the pixels above the pixel in the original image is low (below a threshold value). This procedure results in a binary image of "true" and "false" pixels. In procedure 192, a morphological dilation operation is applied to the binary image. Procedure 192 is analogous to procedure 176 with reference to FIG. 6.

In procedure 194, falsely identified stent pixels are eliminated from the binary image. Pixels are eliminated based on several characteristics, such as if a patch of stent pixels has a large number of pixels (i.e., above a threshold value), and the outlying mean value of the pixels in the patch.

In procedure 196, the correlation value between consecutive IVUS images in the batch is determined. In procedure 198, it is determined whether a stent indeed exists within the image batch. A stent is deemed to exist in a given IVUS image if several conditions are met. These conditions include: the number of patches of stent pixels, and the correlation value between consecutive images. If the number of images within a batch that contain a stent exceeds a threshold value, then it is concluded that a stent appears in the batch. The location of the stent strut is determined in accordance with the lower boundary of each patch of stent pixels.

Since a stent can span several batches, and the stent may not appear clearly indicated in several of those batches, sequence-level procedure 108 is performed to determine the final border of the stent (or stents).

Referring back to FIG. 1, in procedure 110, the preliminary outer boundary of the artery is extracted. At this stage, the extracted outer boundary is only a preliminary result that will likely be adjusted later in a second pass. The ensuing second pass utilizes blood and tissue classification data to more accurately extract the boundary. The first pass is performed at this point to ensure that statistical analysis of the pixels (a subsequent procedure directed to extract the inner boundary of the artery), is not performed in extraneous regions, such as beyond the outer boundary. Since the statistical analysis involves high complexity, reducing unnecessary performance of that operation significantly reduces the overall complexity of the segmentation method and saves a lot of time. The preliminary outer boundary refers herein to the outer boundary extracted during this first pass, which does not utilize blood and tissue classification data.

The preliminary outer boundary may be detected using a dynamic programming algorithm, such as the Viterbi algorithm (will be elaborated further with reference to procedure 120). Since the first pass does not take into account the subsequent blood and tissue classification, the dynamic programming procedure may tend to be drawn to large gradients within the intima/media layers, which interfere with proper detection. Consequently, the first pass is better suited to limiting the number of pixels to classify, while a second pass is still required to achieve a high quality outer boundary.

In procedure 112, images in each batch are tracked to counter various distortions. The IVUS image sequence exhibits various cyclic and repetitive transformations, due to the cardiac pulse cycle and the stiffness of the catheter. Some of these transformations cannot be compensated for by an analytic counter-transformation in the image plane, similar to that performed for roll stabilization. Tracking the images is necessary for the accurate determination of the inner boundary based on image statistics, since the statistics are calculated on a series of images rather than on individual images. During tracking, the images are not actually altered (or stabilized). This procedure merely involves finding the precise change of the position of a pixel in different images, or the relative movement between adjacent image frames.

Transformations include:
rotation "roll" as described earlier;
lateral motion of the imaging tip of the catheter within the artery, appearing as a translation of Cartesian images;
overall expansion and contraction of the artery, caused by variations in blood pressure through the pulse cycle (apparent as up-and-down translation in polar images);
deformation of the artery over the pulse cycle, i.e., the artery having different shapes at different cycle phases;
back and forth motion of the catheter in the longitudinal direction of the artery; and
change in the angle of the catheter relative to the artery.

These transformations cause many of the pixel positions to correspond to blood in some phases of the cardiac cycle and to tissue in others, making it difficult to determine the classification of a pixel in a series of images.

In order to overcome this effect, the series of intensities for which statistical properties are later calculated is not taken from the same pixel coordinate at each image in the batch. Instead, the pixel coordinates are shifted to compensate for the vessel movements. The amount and direction by which each pixel coordinate needs to be shifted is determined by calculating the offsets between contiguous images over a sparse grid of image rectangles. These offsets are known as "motion vectors". For example, the grid may divide the IVUS images into 4×4 squares, where the two-dimensional offset of each square relative to the previous image can be calculated (e.g., using the Kanade-Lucas algorithm), and the resulting offset attributed to the coordinate at the center of the square. Using these offsets, it is possible to calculate, for each pixel coordinate at some IVUS image, the corresponding, motion-compensated coordinate at the previous image in the series, as well the corresponding coordinate at the next image in the series. Since the offsets are calculated on a sparse grid, rather than at every pixel coordinate, bilinear interpolation is used to calculate the motion-compensating offsets at pixel coordinates that are not at the center of a grid square. By accumulating offsets between consecutive image pairs, the pixel coordinate that corresponds to a given point position at a given IVUS image can be found at images that are not contiguous to the given image.

The motion vectors are saved and utilized in the subsequent statistical analysis procedure. The process for finding the motion vectors also takes into account the first pass outer boundary, as well as the guide wire and calcium data, to reduce unnecessary computations. Everything beyond (i.e., at a greater radius than) the calcium region can be ignored as can the entire sector where the guide wire is located. It is appreciated that because searching for the motion vectors involves checking a large number of pixels, eliminating processing of unnecessary pixels saves a lot of time.

In procedure 114, roll offsets are estimated between each pair of consecutive images. The roll offset of each image frame relative to the preceding image is valuable information, which is required for accurate three-dimensional reconstruction and for manual boundary editing. The roll offsets can also be used during the segmentation method for roll stabilization purposes.

A straightforward approach for computing the roll offsets is similar to the two-dimensional Kanade-Lucas algorithm described earlier. In the implementation for computing the roll offsets, the algorithm is applied only to the θ direction within the polar image, limiting the algorithm to finding the θ direction offset (this is the only offset that is of interest).

One approach is to utilize the tracking phase to provide roll offsets based on statistics of the horizontal component of the motion vectors of each square sub-region. The chosen statistic is a median of the horizontal motion vectors that have the largest magnitude in their respective columns. In this fashion, a good approximation of the average roll offset in the entire image is obtained. A mathematical formulation of this approach is as follows:

$$\text{median}_{col} V_\theta^{max\_row}; \text{max\_row=row\_index}$$
$$(\max_{row} |V_\theta|) \text{ per column.}$$

It is appreciated that in an embodiment of the disclosed technique, procedure 114 is performed instead of roll stabilization. The relative offsets between every two images are obtained, and there is no need to actually alter (i.e., stabilize)

the images themselves for the purposes of segmentation. Stabilization may even diminish the performance of the dynamic programming algorithm for extracting the outer boundary, which process consecutive images on a sequence basis. Stabilization may however be beneficial for other applications later on.

In procedure 116, roll offsets are accumulated at the sequence level. The accumulated roll offsets are then scaled up, in order to compensate for the initial scaling down, if necessary.

In procedure 118, statistical analysis is performed on each batch of the image sequence. Computed statistics in different artery regions allows a rough classification to be made in the images between blood and tissue regions. This classification is based on the temporal behavior of the image sequence, and in particular, the presence or absence of "blood speckling" in a series of consecutive images.

Ultrasound images typically have a speckled appearance, that is, the images are not smooth but rather exhibit a pattern of bright and dark spots. In image regions that correspond to tissue, the speckling is caused by alternating constructive and destructive interference between ultrasound beams reflected in different directions by tissue components. The speckles are relatively static, i.e., a bright or dark spot in one image can be tracked to preceding and succeeding images. Image regions corresponding to blood are also speckled, but the speckling there is caused by reflections from clusters of cells in the blood. Due to the blood flow, the speckles in the image regions corresponding to blood are dynamic (i.e., these speckles change rapidly and randomly from one image to the next).

In IVUS image sequences captured at ultrasound probing frequencies greater than or equal to 40 MHz, the average image intensity (brightness) at blood and tissue regions can often be nearly indistinguishable. Likewise, the texture (pattern) in blood and in tissue can be almost identical in individual IVUS images. In such cases, blood can be distinguished from tissue only by the characteristic speckling thereof, i.e., by the rapidly change in the pattern of light and dark spots. Blood speckle detection enables the detection of the vessel lumen, and may also facilitate the detection of other vessel features, such as bifurcations and stent apposition.

For each pixel in every image, the blood speckle is detected by calculation of certain statistical properties relating to the intensity of a pixel and of the corresponding pixels in adjacent images. The statistics are calculated over a series of images which is typically quite short relative to the entire image sequence (e.g., a typical series length is 15), and is centered on the image in which blood speckle is to be detected. In particular, it was found that blood is best separated from tissue by first- and second-order time statistics, primarily the average intensity $AV_t$ and the total variation $TV_t$, respectively defined by:

$$AV_t = E(w_i) = \frac{1}{n}\sum_{i=0}^{n-1} w_i \text{ and}$$

$$TV_t = \sum_{i=1}^{n-1} |w_i - w_{i-1}|,$$

where: $(w_0, \ldots, w_{n-1})$ are the intensities of a pixel over a series of length n.

The average intensity parameter $AV_t$ measures the average intensity or brightness of a pixel over time. The total variation parameter $TV_t$ measures how much the intensity of a pixel tends to vary over time. Pixels inside the lumen generally show a greater variation and a lower average intensity than other pixels. A rough blood detection predicate is: $AV_t < c_1$ and $TV_t > c_2$, i.e., a low average intensity and a high total variation. The thresholds $c_1$ and $c_2$ are determined empirically to yield few false positives (i.e., pixels wrongly classified as blood in tissue regions), and enough true positives (i.e., pixels correctly classified as blood) to enable the subsequent stages to correctly determine the lumen area.

Additional statistical properties that may be calculated include:

number of extrema;
variance:

$$\sigma^2 = E((w_i - AV_t)^2) = \frac{1}{n-1}\sum_{i=0}^{n-1}(w_i - AV_t)^2;$$

standard deviation:

$$\sigma = \sqrt{\sigma^2};$$

skewness:

$$\gamma_3 = \frac{1}{\sigma^3}E((w_i - AV_t)^3) = \frac{1}{N\sigma^3}\sum_{i=0}^{n-1}(w_i - AV_t)^3;$$

and
kurtosis:

$$\gamma_3 = \frac{1}{\sigma^4}E((w_i - AV_t)^4) = \frac{1}{N\sigma^4}\sum_{i=0}^{n-1}(w_i - AV_t)^4 - 3.$$

If these statistics were calculated over a series of pixel intensities at identical positions in consecutive images, then the differences between the typical values of the statistics at blood and tissue pixels would be relatively weak. The reason is that a given pixel coordinate could change from a blood pixel to a tissue pixel (or vice-versa) over a series of images, due to the various transformations described in procedure 112. Therefore, the statistical properties are calculated for pixel coordinates that are shifted between images, where the amount and direction by which each pixel coordinate needs to be shifted is determined according to the motion vectors.

In order to learn the typical values of pixel intensity statistical properties in blood and in tissue, these values are calculated on IVUS images where the vessel boundaries have been manually traced by a user (i.e., a user who is skilled in IVUS interpretation). This is known as "learning system" type algorithm. In a learning system, there are parameters that can be learned automatically, by analyzing sample inputs and the desired outputs for these inputs.

Since an entire IVUS image sequence typically consists of several thousand images, it is unreasonable for the user to manually trace all of the images. Instead, the user traces a sample of the image sequence obtained originally, for example one out of every sixty images.

A computer application allows the user to trace the vessel boundaries on the obtained IVUS images, which are displayed on a computer screen. It is noted that if the images are initially captured in polar coordinate form, they are converted to Cartesian images for the purpose of manual tracing. The tool includes video controls, such as play, pause, fast-forward, and the like, that allows a segment of the image sequence to be played in forward and reverse, and provide the user with a better understanding of the images by observing dynamic characteristics of the vessel. The user demarcates the inner and outer boundaries of the vessel by placing "control points" on the image. The computer application connects these control points with cyclic splines (i.e., closed curves that smoothly interpolate the points). The user may manually add, move, or delete the control points, as required. The computer screen continuously displays the geometry of the spline as the control points are manipulated. The user may also mark any bifurcations and calcium deposits visible in the IVUS images.

Figure 8:
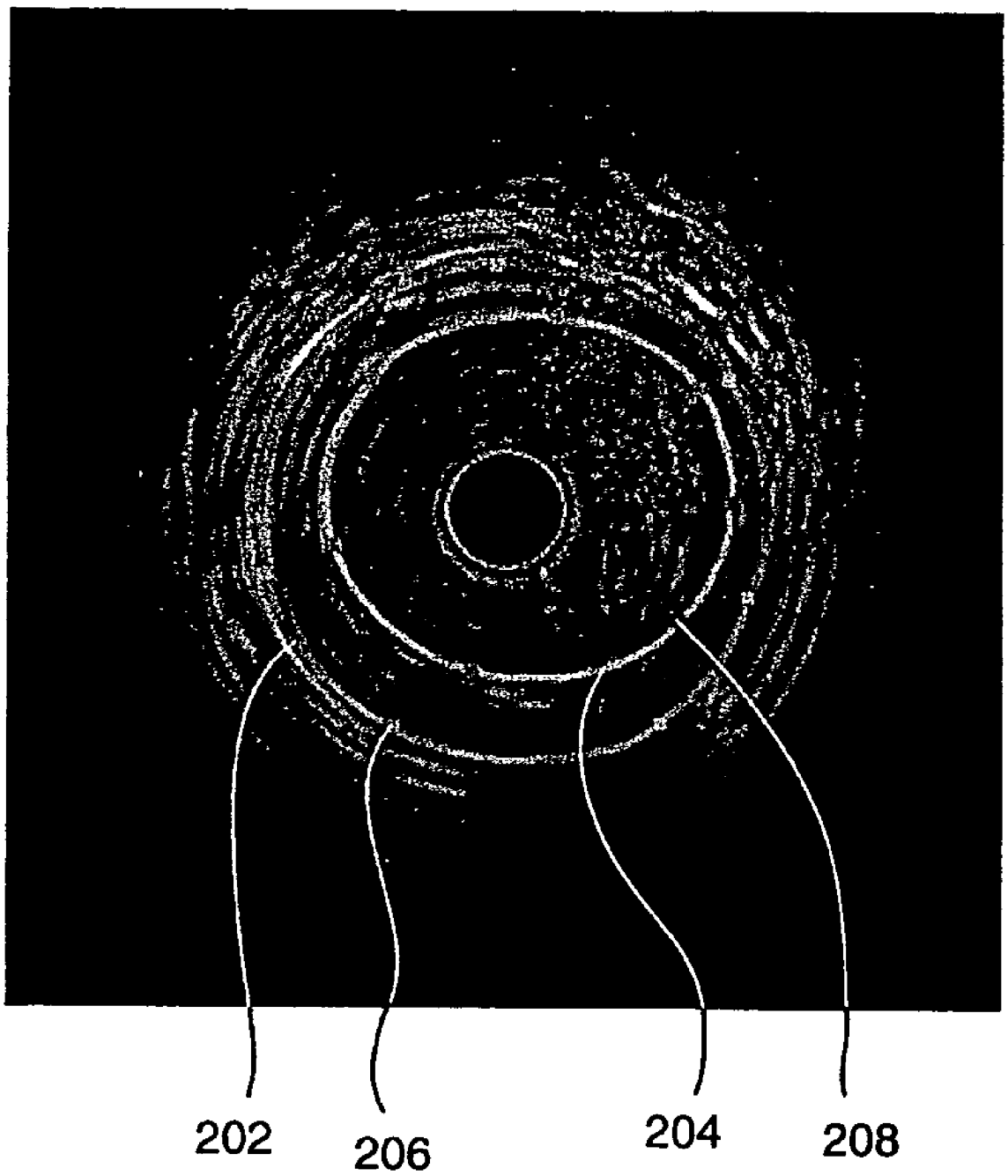
FIG. 8 is an IVUS image in Cartesian coordinates of a coronary artery with the vessel boundaries manually traced.

Reference is now made to FIG. 8, which is an IVUS image in Cartesian coordinates of a coronary artery with the vessel boundaries manually traced. There are two splines shown in FIG. 8. Spline 202 represents the outer boundary of the artery and spline 204 represents the inner boundary. Point 206 is a control point attributed to outer boundary spline 202 and point 208 is a control point attributed to inner boundary spline 204.

The manually traced images may be used to assess the performance of the segmentation results. For example, the quality of the automatic segmentation method can be measured by quantitative comparison to manual segmentation of the same input. One such measure could be, for example, the area of the symmetric difference between the manual and automatic segmentations of the same boundary.

The splines separate each traced IVUS image into three distinct regions: the inner region, or the lumen; the intermediate region, or the media (which also includes intima and any plaque); and the outer region, or the adventitia. This is accomplished by having the user trace two boundaries: the luminal (inner) boundary and the medial-adventitial (outer) boundary. The latter corresponds to the external elastic membrane (EEM) of the blood vessel.

Figure 9A:
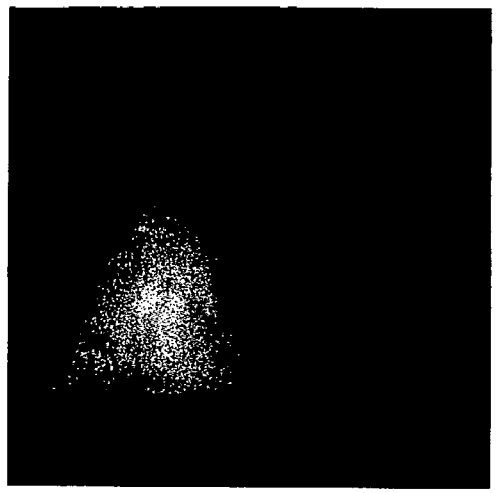
FIG. 9A is an image of a histogram showing the number of pixels in a traced sample of IVUS images that have a specific average intensity (x axis) and total variation (y axis) in the lumen layer.
Figure 9B:
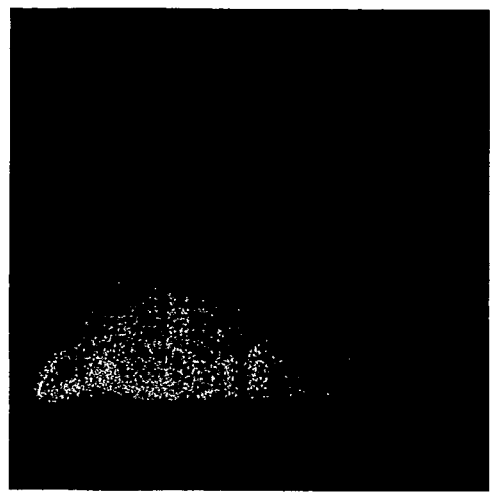
FIG. 9B is an image of a histogram showing the number of pixels in a traced sample of IVUS images that have a specific average intensity (x axis) and total variation (y axis) in the media layer.

The manually traced images are utilized to make the method automatically "learn" the required decision rule to differentiate between blood and tissue. The method is broadly divided into two main stages: the "learning stage" and the "runtime stage". The input to the learning stage constitutes a number of manually traced IVUS images, along with the coordinates of the control points of the manually traced splines. The images are tracked to obtain motion vectors as described in procedure 112, and the splines are converted to polar coordinates. Using the splines in polar coordinates, every pixel of the corresponding images is classified as lying either in the lumen, media or adventitia layer of the vessel. Since blood speckle detection is eventually performed only inside the outer boundary, the statistical properties are calculated only at pixel positions in the luminal and medial regions, as determined by the manual traces. For each of these two regions, a two-dimensional histogram is constructed for the average intensity and for the total variation ($AV_t$ and $TV_t$). These histograms are constructed by quantizing the ranges of these statistics into discrete bins, and counting the number of pixels of the relevant layer whose statistical values fall within each bin. It is noted that pixels with a very low time variation are ignored, as they fall in uninformative regions of the IVUS image, such as the catheter. Each of the two histograms is then converted to a logarithmic scale, normalized, and smoothed by a Gaussian filter. Reference is made to FIGS. 9A and 9B. FIG. 9A is an image of a histogram showing the number of pixels in a traced sample of IVUS images that have a specific average intensity (x axis) and total variation (y axis) in the lumen layer. FIG. 9B is an image of a histogram showing the number of pixels in a traced sample of IVUS images that have a specific average intensity (x axis) and total variation (y axis) in the media layer.

Figure 10:
FIG. 10 is an image of a classification table.

A "classification table" is developed for determining whether a given combination of average intensity and total variation is more likely to represent a blood pixel or a tissue pixel. This table is simply the difference between the lumen (blood) histogram and the media (tissue) histogram. Reference is now made to FIG. 10, which is an image of a classification table. The brightness of a given pixel shows how likely the pixel is to represent blood rather than tissue.

Due to the attenuation of the ultrasound signals, the characteristic appearance and behavior of IVUS images, both in blood and in tissue, depends on the distance from the imaging catheter (i.e., the radius). Specifically, the ultrasound image generally gets darker and loses contrast in regions farther away from the catheter. Even the time-gain control (TGC) of the IVUS imaging device, which selectively amplifies the signal by modifying the gain as a function of the radius, does not fully compensate for this effect. Furthermore, TGC cannot be relied upon to cancel the attenuation effect in an automatic vessel segmentation system that receives input from an IVUS imaging device in which TGC is user-controllable. Hence, a single classification table cannot be adequate for all radii. Therefore, the radius domain of the IVUS images is divided into several distinct "bands", and a different classification table (difference of the luminal and medial histograms) is generated for each band. It has been found that three radius bands were sufficient for a good quality classification of the pixels in each band as either blood or tissue.

During the runtime stage of the method, pixel intensity statistics (e.g., $AV_t$ and $TV_t$) are calculated for each pixel in the new IVUS image sequence (i.e., the one that has not been manually traced) as they were during the learning stage. The statistics are used to look up one of the classification tables constructed at the learning stage, specifically the table for the radius band that contains the pixel for which the statistics were calculated. The value looked up in the classification table is compared to a threshold. If the value exceeds the threshold, then the pixel is deemed to be blood.

A threshold value of zero would yield "true" at exactly those pixels that are more likely to be blood than tissue. However, such a threshold would also yield numerous false positives, i.e., tissue pixels erroneously classified as blood. Therefore, the threshold is set to a somewhat higher value. This yields a "true" value at many, but not all, of the blood pixels.

Figure 11C:
FIG. 11C is a binary image demonstrating the result of geometric considerations on the image in FIG. 11B.
Figure 11B:
FIG. 11B is a binary image demonstrating the result of the morphological closing operator on the image in FIG. 11A.
Figure 11A:
FIG. 11A is a binary image demonstrating the application of a threshold on a classification table.

The rough classification performed above yields a sparse binary image having "true" pixels peppering the lumen area, with hardly any false positives in the intermediate layer. Reference is made to FIG. 11A, which is a binary image demonstrating the application of a threshold on a classification table. If the threshold was selected to give a solid "true" area in the lumen, it would have to be set so low that numerous false positives would appear in the intermediate layer, making it difficult to separate the intermediate layer from the lumen. The catheter band at the bottom of the polar image is also free of "true" pixels.

Spatial integration involves converting the "noisy" map generated (such as the image shown in FIG. 11A) into a clear-cut partitioning of blood and tissue areas, also referred to as a "blood mask". This involves three steps: morphological closing, geometric consideration, and smoothing.

The morphological closing operator, which involves dilation followed by erosion, closes the gaps between the detected blood pixels. Reference is made to FIG. 11B, which is a binary image demonstrating the result of the morphological closing operator on the image in FIG. 11A. The structuring element of both dilation and erosion is a circle. The radius of the circle is determined during the learning stage as the radius is of the largest circle that can be fit in between "true" pixels in the blood region. A possible implementation of the dilation and erosion is to simply compare a distance map of the "true" pixels to the radius of the circular structuring element. The distance map is calculated via Danielsson's algorithm, slightly modified for cyclicity in the angular ($\theta$) direction.

The next step is geometric consideration, which involves finding for each angular direction of the polar image, the radius where the luminal boundary intersects that angular direction. That radius is the smallest radius where the binary image drops from "true" to "false", provided that the transition to "true" did not occur at too high a radius (which usually happens when there are no lumen pixels in the angular direction, because the catheter touched the luminal boundary in that direction). Angular directions where the radius of the luminal boundary is not detected, are assigned a minimal value that represents the radius of the catheter band at the bottom of the polar images. It is noted that in order to identify non-star shaped lumens (e.g., flaps or dissections caused by balloon angioplasty), only this geometric consideration step of spatial integration would have to be modified. Reference is made to FIG. 11C, which is a binary image demonstrating the result of geometric considerations on the image in FIG. 11B. The resulting blood mask is used in the subsequent extraction of the inner and outer boundaries in the IVUS image sequence.

The bottleneck of the segmentation pipeline is the statistical analysis procedure 118, since the classification of every pixel requires substantial computation. Several inputs are therefore added to this procedure to improve the statistical blood detector running time dramatically, simply by skipping the classification of pixels in irrelevant regions. This includes utilizing an estimated first pass for the outer boundary and a calcium indication, assuming non-blood pixels in radii greater than calcium regions, as well as utilizing a guide wire shadow indication, where the whole sector is ignored due to lack of information in the region. The overall segmentation speedup is about 35% of the total execution time in average IVUS inputs, despite the seemingly redundant first pass of finding the outer boundary.

In addition to the spatial sub-sampling described earlier, each image batch is also sampled based on time. Temporal sub-sampling is performed by fully processing only some of the images in the sequence, rather than every image. This generally implies skipping the entire set of procedures for segmentation for certain images, but as noted earlier, it is only necessary to skip the statistical analysis stage (i.e., blood-tissue classification), which is the most time-consuming and computationally extensive. The offsets over a sparse grid of image rectangles are still computed between every pair of consecutive images. However, the statistical analysis procedure—construction of pixel intensity series, calculation of series statistics, classification table lookup, and threshold comparison—is skipped for some of the images.

The fully-processed images can be uniformly distributed over time. For example, if only one third of the images can be fully processed while maintaining a real-time processing rate, then every fully-processed image is followed by two images that are not fully processed. However, such uniform temporal sub-sampling is not optimal, because of the non-uniform rate of IVUS image change. Specifically, the images change much more during systole than during diastole, because the systolic contraction is significantly quicker than the diastolic expansion of the heart. Therefore, rather than distributing the fully-processed images uniformly over time, better usage of the given computational resources is attained by fully processing more images during high-motion segments of the IVUS image sequence, and fewer images in low-motion segments. Such non-uniform temporal distribution of the fully-processed images yields a lower segmentation error than uniform distribution, because it minimizes the span over which errors can accumulate in high-motion phases of the cardiac pulse cycle.

The decision concerning which images merit full processing is accomplished by observing the offsets that are already calculated between every pair of consecutive IVUS images. Since the most prominent component of the image motion caused by the cardiac pulse is a back and forth motion in the $\theta$ direction (i.e., roll), a general measure of the inter-image motion is obtained by averaging the $\theta$ component of the offsets calculated over the entire sparse grid during the tracking procedure. The absolute values of these average $\theta$ offsets are accumulated over an entire image batch and the outcome is divided by the "budget". The budget is the number of images, out of the entire batch, that can be fully segmented while still maintaining a real-time processing rate. The division of the total absolute average $\theta$ offset of the batch by the budget yields the minimum accumulated roll offset for which it is beneficial to fully process an image. For example, if the total absolute value of the average roll of the images over an entire 100 image batch is 150 pixels, and if the budget is 75 images (i.e., in order to maintain a real-time processing rate, only 75 of these 100 images can be fully processed), then only images having a difference of over 150/75=2 pixels in their accumulated roll offsets relative to the previous fully processed image, would be fully processed. This decision rule yields a higher concentration of fully-processed images in high-motion phases of the cardiac pulse cycle than in low-motion phases, thus achieving better utilization of the available computational resources and a lower segmentation error than a uniform temporal distribution of the fully-processed images. In the final stage of temporal sub-sampling, the blood classification in the skipped images is complemented using the closest image (roll offset wise) in which blood classification has been executed. This must be done before the morphological operations, which are performed on the entire batch.

In procedure 120, the secondary outer vessel of the boundary is extracted in a second pass and subsequently refined. This may be performed using dynamic programming, such as the Viterbi algorithm. The secondary outer boundary refers herein to the outer boundary extracted during this second pass, which utilizes blood and tissue classification data. It is noted that for purposes of extracting the outer boundary, the images in the sequence must be spatially associated with one another, (i.e., it is known where each image is with respect to other images in the sequence). The results of the previous procedures (such as the blood tissue classification, guide wire acoustic shadow sector, calcium acoustic shadow regions) are used in the detection of the secondary outer boundary. This ensures that the secondary outer boundary is sought only within the relevant area. The dynamic programming algorithm in the second pass utilizes a smoothed binary blood mask input. By multiplying the image and the smoothed binary blood mask, large gradients in the inner regions are covered or blurred. Avoiding these gradients yields a more accurate result than in the first pass (procedure 110).

EEM detection is executed on the area outside the detected lumen, where an edge detection process relies on the continuity and smoothness of the EEM. A possible implementation is to use the derivative of the pixel intensities in the radial (r) direction as an EEM edge indicator, and to use additional factors in the angular (θ) direction for continuity and smoothness attributes. A Viterbi algorithm is then applied to identify the secondary outer boundary. Since the IVUS catheter actually scans a helix along the vessel, rather than separate cross-sections, the Viterbi algorithm is executed on the entire batch, which is comprised of several consecutive, unstabilized polar images, concatenated in the horizontal direction. This eliminates image discontinuities at the 0°-360° seam, and increases the likelihood of achieving a cyclic outer boundary. In areas shadowed by the guide wire or calcium, the external weight of the path is reduced to zero, resulting in a path that interpolates linearly (in polar coordinates) across the shadow sector. Due to the nature of dynamic algorithms, the added factors of previous columns allow maintaining the continuity and smoothness only backwards. For this reason, the Viterbi algorithm is executed in the reverse direction (i.e., from the end of the batch to the start) as well, and the final EEM is taken as the minimum of the two outputs at each angle.

Figure 12A:
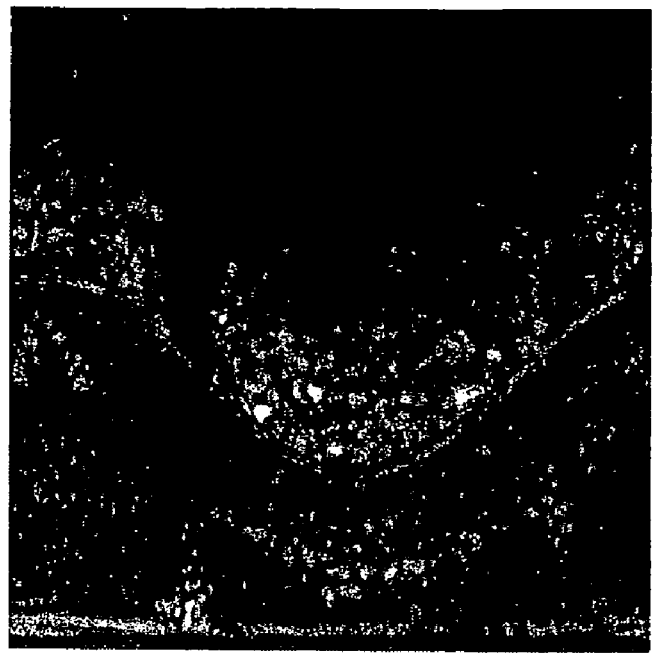
FIG. 12A is an IVUS image in polar coordinates demonstrating the detected EEM boundary and its approximation by an ellipse.
Figure 12B:
FIG. 12B is an IVUS image in Cartesian coordinates demonstrating the detected EEM boundary and its approximation by an ellipse.

The resulting EEM radii sequence is smoothed in the spatial and temporal direction by applying a median and a Gaussian filter in sequence, in each direction. The detected EEM in each Cartesian image can be further approximated by the nearest matching ellipse using least-squares minimization techniques, such as the one described by A. Fitzgibbon et al (A. Fitzgibbon, M. Pilu, R. Fisher "*Direct least-square fitting of Ellipses*", International Conference on Pattern Recognition, Vienna, August 1996). This approximation is justified by the fact that the exterior of the vessel is approximately cylindrical in shape, and therefore can be imaged diagonally by the catheter, yielding an elliptical EEM image. Reference is made to FIGS. 12A and 12B. FIG. 12A is an IVUS image in polar coordinates demonstrating the detected EEM boundary and its approximation by an ellipse. FIG. 12B is an IVUS image in Cartesian coordinates demonstrating the detected EEM boundary and its approximation by an ellipse.

If the IVUS images were initially scaled down, the extracted secondary outer boundary is now scaled up to match the original size of the image.

In procedure 122, the inner boundary of the vessel is extracted based on the blood-tissue classifications. A simple metric is performed on the blood mask in order to extract the inner boundary. This procedure utilizes information from the guide wire detection stage in order to verify whether blood was incorrectly detected in a guide wire region. Interpolation is done between the edges to obtain the entire area affected by the guide wire, and thereby accurately complete the blood region boundary. More specifically, correction to the inner boundary at the guide wire strip involves linearly interpolating the values of the inner boundary at the ends of a widened strip around the center of the guide wire.

Inner boundary detection further takes into account the outer boundary detected in the previous procedure. The path of the extracted inner boundary is limited if the path exceeds the outer boundary.

The luminal boundary is determined by finding, for each circumferential (θ) direction, the least radial (r) coordinate (beyond a certain minimum radius) where the value of the binary blood masks, after the morphological operators, falls from "true" to "false." This detected luminal boundary is filtered, both in the circumferential (θ) direction and in the longitudinal or temporal (t) direction, first by a median filter, then by a Gaussian filter. The filtering yields a smoother boundary, with less of a tendency to fluctuate between images. The extracted inner boundary is then scaled up to the original size, in order to compensate for the initial scaling down, if necessary.

In procedures 124 and 126, bifurcation regions are identified. A "bifurcation" refers to the branching out of the blood vessel into a separate segment (e.g., a main artery branching off into a secondary artery). Since a single bifurcation can span several batches, this task is divided into batch-level processing (procedure 124) and sequence-level processing (procedure 126).

It is noted that the actual form of the bifurcation is not identified, but merely the region in the vessel where the bifurcation exists. Features regarding the value of the pixels in the original image are searched for along the detected outer boundary. If there is a bifurcation sector in a specific (polar) image, the outer boundary will cut across a sector of blood-speckles. In contrast to the statistical analysis in procedure 118, here the blood speckles are not detected temporally (i.e., in consecutive images), but linearly, along a curve at a constant offset beyond the detected outer boundary. A vector of gray scales is built along that curve, for the entire batch, to aid processing.

Reference is made to FIGS. 13A, 13B, and 13C. FIG. 13A is a series of three IVUS images in polar coordinates demonstrating valid bifurcation sectors. FIG. 13B is the middle IVUS image of FIG. 13A in Cartesian coordinates demonstrating a valid bifurcation sector. FIG. 13C is a longitudinal section at an angle of 0° of an entire IVUS image sequence, centered on the IVUS image of FIG. 13B. It is noted that FIG. 13C shows a few false positive sectors in the vicinity of the actual bifurcation region, which will subsequently be eliminated during sequence level processing.

Batch-level procedure 124 processes the outer boundary input as a single one-dimensional vector for the entire batch. The output of batch-level procedure 124 is a single one-dimensional Boolean vector, representing angular sectors in which bifurcations have been identified. The batch vectors are then concatenated and analyzed at a sequence level in procedure 126, to yield valid output only in regions where angular sectors were identified along several image frames at approximately the same angular displacement. Additionally, bifurcation regions may be identified via other medical imaging modalities, such as planar/bi-planar fluoroscopic angiography, and the like. Together with the prior knowledge of the three-dimensional position and orientation of each IVUS image, this additional information may assist sequence-level procedure 126 by refining the output even further. The output of sequence-level procedure 126 is a rectangular patch for every valid bifurcation, given by the range of image frames and the angular sector occupied. It is noted that bifurcation extraction (and subsequent procedures) is performed on the original resolution images, rather than scaled down images, if scaling down has been performed.

Batch-level procedure 124 is based on the observation that at vessel bifurcations, the detected outer boundary contour cuts through the blood speckles (see FIGS. 13A and 13B). The bifurcation sector is characterized by low average pixel intensities and high horizontal frequencies (horizontal speckling). Moving at a constant radial offset along the detected outer boundary, the gray levels of the pixels are observed. The pixels of gray level peaks are identified as well.

An averaging window is then used around each pixel to obtain the average intensities around the pixel and a summation window of the same size to count the number of gray level peaks (see FIG. 11A). The mean values of these two measures along the entire batch are also calculated.

Next, based on these two measures, bifurcation angular sectors are identified only where more than a minimal number of consecutive pixels have:
 a) an average intensity lower than the mean pixel intensity in the batch; and
 b) a number of gray level peaks larger than the mean number of gray level peaks in the batch (see FIG. 11A again).

To improve the accuracy of the bifurcation sectors identification, uninformative regions such as acoustic shadows, characterized by very low pixel intensities and a low number of gray level peaks are removed from the statistics completely. Additional minimal/maximal pixel intensity and minimal number of gray level peak thresholds improve the results further.

At a sequence level, the bifurcation sectors are reviewed and a valid bifurcation patch is output only if the sectors span at least some minimal number of IVUS images, with a permissible gap in between, and if all sectors are centered at approximately the same angular displacement. This excludes false positive sectors identified due to the pullback back and forth movement relative to the vessel or due to slight inaccuracies in the outer boundary detection. The angular width of the patch is set according to the average width of its sectors, and the length of the patch is the total span of its IVUS images.

In procedure 128, manual editing of the segmentation output is performed where desired. In some cases, the user may wish to manually modify the segmentation output in selected images. Procedure 128 enables the integration of manual editing performed by a user on the detected boundaries in a given image, while adjusting the boundaries in adjacent images to seamlessly integrate the manual modification. It is noted that the boundaries are stored in polar coordinates, with the value of each boundary point representing the radial distance at that angle.

There are two considerations to take into account. Firstly, the boundaries edited by the user must not be altered by the integration step. This fact rules out the usage of a standard filter spanning over the boundaries of several neighboring images. Secondly, at a point level, the effect of the user modification in the neighboring boundaries should be proportional to the relative radial movement of that point in the manually edited boundary compared to its original radius. The point-level consideration prevents cases where a neighboring boundary is modified considerably at angular sectors where the user made little or no modifications.

Based on the above observations, the integration of the user-edited boundary is performed in two stages. Each neighboring boundary is first linearly interpolated with the manually edited boundary, based on the distance of their corresponding IVUS images (measured in number of images). The weights are set according to a modified Hamming window:

$$H(x, \tau, \alpha) = \begin{cases} \alpha + (1-\alpha)\cos\left(\pi\frac{x}{\tau}\right) & |x| < \tau \\ 0 & \text{else} \end{cases}$$

with an adjusted $\alpha$ and a configurable $\tau$ (the radius of affect). Each interpolated neighboring boundary from the previous stage is further linearly interpolated with its original boundary at a point level, as stated above. The latter stage includes an additional sensitivity factor to control the level of consideration in the absolute radial movement. To improve the accuracy of the interpolations, the boundaries are roll stabilized based on roll offsets calculations performed earlier.

Alternatively, manual editing procedure 128 may serve as feedback for an additional execution of the segmentation pipeline, by forcing the output at specific locations to be identical to "anchor points" specified by the user. In this case, procedures 110 and 120, which involve extraction of the outer boundary, have an additional large negative factor at the user specified points, effectively forcing the dynamic algorithm to pass through these points. Procedures 118 and 122, which involve computation of the blood mask and extraction of the inner boundary, similarly take into consideration the manually edited user input by extending the output to include user specified anchor points in the blood region.

During each of the procedures performed during the runtime stage, a "level of confidence" (LoC) measure may be calculated for each of the computed values, such as for the radius of the luminal boundary at a particular angular direction in a particular IVUS image. The LoC provides an indication of the accuracy of the resulting values. The LoC measure may be represented in either or both of two ways:
 1. As a confidence interval about the computed value, such that the actual value lies within the interval with some predetermined probability (e.g., 95%).
 2. As the probability that the actual value lies within some predetermined interval about the computed value (e.g., ±20 μm).

The particular method by which the LoC of each computed value is determined depends on the way that the value is computed. For example, if the calculation involves comparison of some intermediate value to a fixed threshold, then the LoC depends on the difference between the intermediate value and the threshold. As a particular example, since the Boolean classification of blood pixels involves comparing the value in a classification table to a threshold, then the LoC for the classified blood pixel is a function of how much the value in the classification table exceeds the threshold.

In an optional procedure 130, the final results of the segmentation method are displayed with respect to the calculated LoC measures, so as to inform the user of the degree to which the results may be relied upon. The LoC measures may be presented visually in several ways. For example, the LoC may be presented on a two-dimensional display, such as an IVUS cross-section or longitudinal section where the boundary is shown as a line on the image background. The confidence interval may be shown as two additional lines on either side of the boundary or by modifying the graphic appearance of the boundary line itself. For example, the line may be made wider, fuzzier, more transparent, less intense, or any combination thereof, the lower the LoC. Alternatively, the LoC may be presented in a three-dimensional display of the blood vessel, by making the boundary surface more transparent the lower the LoC, or by displaying the vessel in a wire frame (rather than as a solid shaded surface) in the regions where the LoC falls below some threshold.

It will be appreciated by persons skilled in the art that the disclosed technique is not limited to what has been particularly shown and described hereinabove. Rather the scope of the disclosed technique is defined only by the claims, which follow.

The invention claimed is:

1. A method for performing segmentation of an interior vessel within the body of a patient to detect the inner boundary of said vessel, the method comprising the procedures of:
 obtaining a sequence of intravascular ultrasound (IVUS) images of an interior vessel;

tracking images in said sequence to counter various distortions;
performing statistical analysis and spatial integration on said sequence to obtain a classification of blood and tissue regions;
extracting inner boundary of said interior vessel based on said classification of blood and tissue regions;
scaling down said sequence of IVUS images, at least before said procedure of performing statistical analysis and spatial integration; and
scaling up said extracted inner boundary.

2. A method for performing segmentation of an interior vessel within the body of a patient to detect the outer boundary of said vessel, the method comprising the procedures of:
obtaining a sequence of intravascular ultrasound (IVUS) images of an interior vessel wherein images in said sequence of IVUS images are spatially associated with one another;
extracting an outer boundary of said interior vessel utilizing dynamic programming;
scaling down said sequence of IVUS images, at least before said procedure of extracting an outer boundary; and
scaling up said extracted outer boundary.

3. A method for performing segmentation of an interior vessel within the body of a patient to detect both the inner boundary and the outer boundary of said vessel, the method comprising the procedures of:
obtaining a sequence of intravascular ultrasound (IVUS) images of an interior vessel;
tracking images in said sequence of IVUS images to counter various distortions;
performing statistical analysis and spatial integration on said sequence of IVUS images to obtain a classification of blood and tissue regions;
extracting inner boundary of said interior vessel based on said classification of blood and tissue regions;
extracting an outer boundary of said interior vessel utilizing dynamic programming;
scaling down said sequence of IVUS images, at least before said procedure of performing statistical analysis and spatial integration; and
scaling up said extracted outer boundary and said extracted inner boundary.

4. The method according to claim 2, wherein said sequence of IVUS images is divided into batches.

5. The method according to claims 1 or 3, wherein said sequence of IVUS images is divided into batches.

6. The method according to claim 5, further comprising the procedures of:
detecting stents in each of said batches; and
determining borders of said stents in said sequence of IVUS images.

7. The method according to claim 5, further comprising the procedures of:
identifying bifurcation sectors in each of said batches; and
computing bifurcation regions in said sequence of IVUS images.

8. The method according to claims 1 or 3, wherein said interior vessel is a coronary artery.

9. The method according to claims 1, 2 or 3, further comprising the procedure of:
performing roll stabilization on said sequence of IVUS images.

10. The method according to claims 1, 2 or 3, further comprising the procedure of:
detecting uninformative regions in said sequence of IVUS images, said uninformative regions arising from an acoustic shadow cast by guide wire and by calcified plaque within said interior vessel.

11. The method according to claims 1, 2 or 3, further comprising the procedure of:
extracting a preliminary outer boundary of said interior vessel.

12. The method according to claim 11, wherein said extracted preliminary outer boundary is detected using a dynamic programming algorithm.

13. The method according to claims 1 or 2, wherein said procedure of tracking images involves finding the relative movement between adjacent image frames in said sequence of IVUS images by calculating motion vectors, each of said motion vectors being the offset between adjacent image frames over a sparse grid of image rectangles.

14. The method according to claims 1 or 2, wherein said procedure of tracking images is performed using a two-dimensional Kanade-Lucas algorithm.

15. The method according to claims 1 or 3, wherein said classification of blood and tissue regions is based on the presence or absence of blood speckle in said images.

16. The method according to claims 1 or 3, wherein said procedure of performing statistical analysis and spatial integration involves calculating statistical properties relating to the intensities of a pixel over a series of said images.

17. The method according to claim 16, wherein said statistical properties are calculated over a series of pixel intensity values taken from corresponding pixel coordinates in consecutive IVUS images.

18. The method according to claim 16, wherein said statistical properties are calculated over a series of pixel intensity values taken from adjacent pixel coordinates in an individual IVUS image.

19. The method according to claim 16, wherein said procedure of tracking images involves finding the relative movement between adjacent image frames in said sequence of IVUS images by calculating motion vectors, each of said motion vectors being the offset between adjacent image frames over a sparse grid of image rectangles, wherein said statistical properties are calculated for pixel coordinates that are shifted between said images in accordance with said motion vectors.

20. The method according to claim 16, wherein said statistical properties are learned from manually traced images, said manually traced images being IVUS images where the inner and outer boundaries of said interior vessel have been manually traced by a user.

21. The method according to claims 1 or 3, wherein said procedure of performing statistical analysis and spatial integration, is performed on temporally sub-sampled images in said sequence of IVUS images.

22. The method according to claim 21, wherein said temporally sub-sampled images are non-uniformly distributed over time.

23. The method according to claims 2 or 3, wherein said procedure of extracting an outer boundary of said interior vessel, is performed based on said blood mask.

24. The method according to claims 2 or 3, wherein said procedure of extracting an outer boundary of said interior vessel involves approximating said extracted outer boundary in said images with the nearest matching ellipse.

25. The method according to claims 2 or 3, wherein said dynamic programming algorithm is performed using a Viterbi algorithm.

26. The method according to claims 2 or 3, wherein said dynamic programming algorithm is executed in an additional pass in a reverse direction.

27. The method according to claims 1, 2 or 3, further comprising the procedure of;
manually editing output of said segmentation in selected images by a user.

28. The method according to claim 3 further comprising the procedure of;
displaying output of said segmentation with respect to level of confidence measures.

29. A method for performing segmentation of an interior vessel within the body of a patient to detect the inner boundary of said vessel, the method comprising the procedures of:
obtaining a sequence of intravascular ultrasound (IVUS) images of an interior vessel;
tracking images in said sequence to counter various distortions;
performing statistical analysis and spatial integration on said sequence to obtain a classification of blood and tissue regions;
extracting inner boundary of said interior vessel based on said classification of blood and tissue regions; wherein said procedure of detecting uninformative regions in said sequence of IVUS images, comprises the procedures of;
detecting the location of said guide wire in said sequence of IVUS images;
identifying regions of calcified plaque in said sequence of IVUS images; and
integrating said guide wire data with said regions of calcified plaque data.

30. The method according to claim 29, wherein said procedure of detecting the location of said guide wire in said sequence of IVUS images, comprises the procedures of:
locating the radial ray with a maximum difference between the brightness at the bottom of said radial ray and the standard deviation in the rest of said radial ray, by searching all radial rays of every image in said sequence of IVUS images, resulting in a first sequence of radial rays;
locating the radial ray with a maximum difference between the brightness at the bottom of said radial ray and the standard deviation in the rest of said radial ray, by searching only radial rays of every image in said sequence of IVUS images which fit the profile of a typical guide wire radial ray, resulting in a second sequence of radial rays;
locating the radial distance with a maximum intensity within said found radial ray, for said first sequence and for said second sequence;
locating the radial ray with a nearest local maximum intensity within said found radial distance, for said first sequence;
excluding anomalous images from said first sequence and from said second sequence;
applying a median filter to said first sequence and to said second sequence;
fitting a spline through guide wire center radial rays and excluding outlying images from said first sequence and from said second sequence, in two rounds;
fitting a spline through guide wire center radial rays of remaining images in said first sequence and in said second sequence;
calculating dispersion in said first sequence and in said second sequence, said dispersion being the width of said acoustic shadow cast by said guide wire; and selecting a sequence from one of said first sequence and said second sequence by lowest dispersion value, only if said dispersion value is below an allowed threshold.

31. The method according to claim 29, wherein said procedure of detecting the location of said guide wire in said sequence of IVUS images, comprises the procedures of:
locating the column with a maximum difference between the brightness at the bottom of said column and the standard deviation in the rest of said column, by searching all columns of every image in said sequence of IVUS images, resulting in a first sequence of columns;
locating the column with a maximum difference between the brightness at the bottom of said column and the standard deviation in the rest of said column, by searching only columns of every image in said sequence of IVUS images which fit the profile of a typical guide wire column, resulting in a second sequence of columns;
locating the row with a maximum intensity within said found column, for said first sequence and for said second sequence;
locating the column with a nearest local maximum intensity within said found row, for said first sequence;
excluding anomalous images from said first sequence and from said second sequence;
applying a median filter to said first sequence and to said second sequence;
fitting a spline through guide wire center columns and excluding outlying images from said first sequence and from said second sequence, in two rounds;
fitting a spline through guide wire center columns of remaining images in said first sequence and in said second sequence;
calculating dispersion in said first sequence and in said second sequence, said dispersion being the width of said acoustic shadow cast by said guide wire; and
selecting a sequence from one of said first sequence and said second sequence by lowest dispersion value, only if said dispersion value is below an allowed threshold
wherein said IVUS images are provided in polar coordinate form, and wherein the horizontal axis of said IVUS images corresponds to the angular dimension.

32. The method according to claim 29, wherein said procedure of identifying regions of calcified plaque in said sequence of IVUS images, comprises the procedures of;
applying a morphological closing operation to every image in said sequence of IVUS images;
assigning tentative calcium pixels based on pixel intensity characteristics, resulting in a binary image of true and false pixels;
applying a morphological dilation operation to said resulting binary image;
determining boundary of calcified plaque regions; and
ensuring temporal continuity of said calcified plaque regions.

33. A method for performing segmentation of an interior vessel within the body of a patient to detect the inner boundary of said vessel, the method comprising the procedures of:
obtaining a sequence of intravascular ultrasound (IVUS) images of an interior vessel;
tracking images in said sequence to counter various distortions;
performing statistical analysis and spatial integration on said sequence to obtain a classification of blood and tissue regions;
extracting inner boundary of said interior vessel based on said classification of blood and tissue regions;

wherein said sequence of IVUS images is divided into batches;
detecting stents in each of said batches;
determining borders of said stents in said sequence of IVUS images; and
wherein said procedure of detecting stents in each of said batches, comprises the procedures of:
applying a morphological closing operation to every image in each of said batches;
partitioning each image into sub-regions and locating pixels with outlying intensities in each of said sub-regions;
assigning tentative stent pixels based on pixel intensity characteristics, resulting in a binary image of true and false pixels;
applying a morphological dilation operation to said resulting binary image;
eliminating falsely identified stent pixels from said binary image;
determining correlation value between consecutive images in each of said batches; and
determining if a stent exists in a batch for each of said batches.

34. A method for performing segmentation of an interior vessel within the body of a patient to detect the inner boundary of said vessel, the method comprising the procedures of:
obtaining a sequence of intravascular ultrasound (IVUS) images of an interior vessel;
tracking images in said sequence to counter various distortions;
performing statistical analysis and spatial integration on said sequence to obtain a classification of blood and tissue regions;
extracting inner boundary of said interior vessel based on said classification of blood and tissue regions;
wherein said sequence of IVUS images is divided into batches;
estimating roll offsets between each pair of consecutive images in each of said batches; and
accumulating said roll offsets in said sequence of IVUS images.

35. The method according to claim 34, wherein said procedure of estimating roll offsets is performed based on statistics of the angular component of the motion vectors obtained in said procedure of tracking images in each of said batches to counter various distortions, said motion vectors being the offset between adjacent image frames over a sparse grid of image rectangles.

36. A method for performing segmentation of an interior vessel within the body of a patient to detect the inner boundary of said vessel, the method comprising the procedures of:
obtaining a sequence of intravascular ultrasound (IVUS) images of an interior vessel;
tracking images in said sequence to counter various distortions;
performing statistical analysis and spatial integration on said sequence to obtain a classification of blood and tissue regions;
extracting inner boundary of said interior vessel based on said classification of blood and tissue regions;
where said procedure of performing statistical analysis and spatial integration involves calculating statistical properties relating to the intensities of a pixel over a series of said images;
wherein said statistical properties includes properties selected from the list consisting of:
average intensity;
total variation;
number of extrema;
variance;
standard deviation;
skewness; and
kurtosis.

37. A method for performing segmentation of an interior vessel within the body of a patient to detect the inner boundary of said vessel, the method comprising the procedures of:
obtaining a sequence of intravascular ultrasound (IVUS) images of an interior vessel;
tracking images in said sequence to counter various distortions:
performing statistical analysis and spatial integration on said sequence to obtain a classification of blood and tissue regions;
extracting inner boundary of said interior vessel based on said classification of blood and tissue regions;
where said procedure of performing statistical analysis and spatial integration involves calculating statistical properties relating to the intensities of a pixel over a series of said images;
wherein two histograms are constructed based on said manually traced images, one of said histograms indicating the number of pixels in said manually traced images that have a given value of said statistical properties in the inner layer of said interior vessel, the other of said histograms indicating the number of pixels in said manually traced images that have a given value of said statistical properties in the outer layer of said interior vessel.

38. The method according to claim 37, wherein a classification table is generated from said histograms, said classification table being constructed according to the difference between said histograms.

39. The method according to claim 38, wherein the radius domain of said sequence of IVUS images is divided into several distinct bands, and a different classification table is generated for each of said bands.

40. The method according to claim 38, wherein pixels are classified as blood in accordance with said classification table, resulting in a sparse binary image of blood pixels.

41. The method according to claim 40, wherein spatial integration is performed on said sparse binary image of blood pixels resulting in a blood mask, said blood mask being a binary image with contiguous blood pixels.

42. The method according to claim 26, wherein said spatial integration involves performing a morphological closing operation, geometric consideration, and smoothing, on said sparse binary image of blood pixels.

43. The method according to claim 41, wherein said spatial integration involves performing a morphological closing operation, geometric consideration, and smoothing, on said sparse binary image of blood pixels.

44. The method according to claim 40, wherein spatial integration is performed on said sparse binary image of blood pixels resulting in a blood mask, said blood mask being a binary image with contiguous blood pixels.

45. The method according to claim 38, wherein the radius domain of said sequence of IVUS images is divided into several distinct bands, and a different classification table is generated for each of said bands.

46. The method according to claim 38, wherein pixels are classified as blood in accordance with said classification table, resulting in a sparse binary image of blood pixels.

47. The method according to claim 37, wherein a classification table is generated from said histograms, said classification table being constructed according to the difference between said histograms.

48. A method for performing segmentation of an interior vessel within the body of a patient to detect the inner boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   wherein said sequence of IVUS images is divided into batches;
   identifying bifurcation sectors in each of said batches;
   computing bifurcation regions in said sequence of IVUS images; and
   wherein said procedure of identifying bifurcation sectors in each of said batches is based on blood speckles detected linearly along a curve at a constant offset beyond said extracted outer boundary.

49. A method for performing segmentation of an interior vessel within the body of a patient to detect the inner boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   wherein said sequence of IVUS images is divided into batches;
   identifying bifurcation sectors in each of said batches;
   computing bifurcation regions in said sequence of IVUS images; and
   wherein said procedure of identifying bifurcation sectors in each of said batches is performed excluding said detected uninformative regions arising from an acoustic shadow cast by guide wire and by calcified plaque within said interior vessel.

50. A method for performing segmentation of an interior vessel within the body of a patient to detect the inner boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   wherein said sequence of IVUS images is divided into batches;
   identifying bifurcation sectors in each of said batches;
   computing bifurcation regions in said sequence of IVUS images; and
   wherein said procedure of computing said bifurcation regions in said sequence of IVUS images is assisted by bifurcation regions identified via at least one medical imaging modality.

51. The method according to claim 50, wherein said at least one medical imaging modality includes planar or bi-planar fluoroscopic angiography.

52. A method for performing segmentation of an interior vessel within the body of a patient to detect the inner boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   manually editing output of said segmentation in selected images by a user; and
   wherein said procedure of manually editing output of said segmentation involves integrating manual editing on the detected boundaries in a given image by said user, while adjusting the boundaries in adjacent images to seamlessly integrate said manual editing.

53. The method according to claim 52, wherein said procedure of manually editing output of said segmentation further considers the relative movement of each pixel in a manually edited boundary relative to the original boundary.

54. A method for performing segmentation of an interior vessel within the body of a patient to detect the inner boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   manually editing output of said segmentation in selected images by a user; and
   wherein said procedure of manually editing output of said segmentation serves as feedback for an additional execution of said segmentation method, by forcing the output at desired locations to be identical to anchor points specified by said user in said manual edited images.

55. A method for performing segmentation of an interior vessel within the body of a patient to detect both the inner boundary and the outer boundary of said vessel, the method comprising the procedures of:
   obtaining a sequence of intravascular ultrasound (IVUS) images of an interior vessel;
   tracking images in said sequence to counter various distortions;
   performing statistical analysis and spatial integration on said sequence to obtain a classification of blood and tissue regions;
   extracting inner boundary of said interior vessel based on said classification of blood and tissue regions;
   extracting an outer boundary of said interior vessel utilizing dynamic programming;
   displaying output of said segmentation with respect to level of confidence measures; and
   wherein said level of confidence measures is represented as a confidence interval about the computed value of said output of said segmentation, such that the actual value of said output of said segmentation lies within said interval with a predetermined probability.

56. A method for performing segmentation of an interior vessel within the body of a patient to detect both the inner boundary and the outer boundary of said vessel, the method comprising the procedures of:
- obtaining a sequence of intravascular ultrasound (IVUS) images of an interior vessel;
- tracking images in said sequence to counter various distortions;
- performing statistical analysis and spatial integration on said sequence to obtain a classification of blood and tissue regions;
- extracting inner boundary of said interior vessel based on said classification of blood and tissue regions;
- extracting an outer boundary of said interior vessel utilizing dynamic programming:
- displaying output of said segmentation with respect to level of confidence measures; and
- wherein said level of confidence measures is represented as the probability that the actual value of said output of said segmentation lies within some predetermined interval about the computed value of said output of said segmentation.

57. A method for performing segmentation of an interior vessel within the body of a patient to detect both the inner boundary and the outer boundary of said vessel, the method comprising the procedures of:
- obtaining a sequence of intravascular ultrasound (IVUS) images of an interior vessel;
- tracking images in said sequence to counter various distortions;
- performing statistical analysis and spatial integration on said sequence to obtain a classification of blood and tissue regions;
- extracting inner boundary of said interior vessel based on said classification of blood and tissue regions;
- extracting an outer boundary of said interior vessel utilizing dynamic programming;
- detecting uninformative regions in said sequence of IVUS images, said uninformative regions arising from an acoustic shadow cast by guide wire and by calcified plaque within said interior vessel;
- wherein said procedure of detecting uninformative regions in said sequence of IVUS images, comprises the procedures of:
- detecting the location of said guide wire in said sequence of IVUS images;
- identifying regions of calcified plaque in said sequence of IVUS images; and
- integrating said guide wire data with said regions of calcified plaque data.

58. The method according to claim 57, wherein said procedure of detecting the location of said guide wire in said sequence of IVUS images, comprises the procedures of:
- locating the column with a maximum difference between the brightness at the bottom of said column and the standard deviation in the rest of said column, by searching all columns of every image in said sequence of IVUS images, resulting in a first sequence of columns;
- locating the column with a maximum difference between the brightness at the bottom of said column and the standard deviation in the rest of said column, by searching only columns of every image in said sequence of IVUS images which fit the profile of a typical guide wire column, resulting in a second sequence of columns;
- locating the row with a maximum intensity within said found column, for said first sequence and for said second sequence;
- locating the column with a nearest local maximum intensity within said found row, for said first sequence;
- excluding anomalous images from said first sequence and from said second sequence;
- applying a median filter to said first sequence and to said second sequence;
- fitting a spline through guide wire center columns and excluding outlying images from said first sequence and from said second sequence, in two rounds;
- fitting a spline through guide wire center columns of remaining images in said first sequence and in said second sequence;
- calculating dispersion in said first sequence and in said second sequence, said dispersion being the width of said acoustic shadow cast by said guide wire; and
- selecting a sequence from one of said first sequence and said second sequence by lowest dispersion value, only if said dispersion value is below an allowed threshold
- wherein said IVUS images are provided in polar coordinate form, and wherein the horizontal axis of said IVUS images corresponds to the angular dimension.

59. A method for performing segmentation of an interior vessel within the body of a patient to detect the outer boundary of said vessel, the method comprising the procedures of:
- obtaining a sequence of intravascular ultrasound (IVUS) images of an interior vessel wherein images in said sequence of IVUS images are spatially associated with one another,
- extracting an outer boundary of said interior vessel utilizing dynamic programming;
- detecting uninformative regions in said sequence of IVUS images, said uninformative regions arising from an acoustic shadow cast by guide wire and by calcified plaque within said interior vessel; and
- wherein said procedure of detecting uninformative regions in said sequence of IVUS images, comprises the procedures of:
- detecting the location of said guide wire in said sequence of IVUS images;
- identifying regions of calcified plaque in said sequence of IVUS images; and
- integrating said guide wire data with said regions of calcified plaque data.

60. The method according to claim 59, wherein said procedure of detecting the location of said guide wire in said sequence of IVUS images, comprises the procedures of:
- locating the radial ray with a maximum difference between the brightness at the bottom of said radial ray and the standard deviation in the rest of said radial ray, by searching all radial rays of every image in said sequence of IVUS images, resulting in a first sequence of radial rays;
- locating the radial ray with a maximum difference between the brightness at the bottom of said radial ray and the standard deviation in the rest of said radial ray, by searching only radial rays of every image in said sequence of IVUS images which fit the profile of a typical guide wire radial ray, resulting in a second sequence of radial rays;
- locating the radial distance with a maximum intensity within said found radial ray, for said first sequence and for said second sequence;
- locating the radial ray with a nearest local maximum intensity within said found radial distance, for said first sequence;
- excluding anomalous images from said first sequence and from said second sequence;

applying a median filter to said first sequence and to said second sequence;

fitting a spline through guide wire center radial rays and excluding outlying images from said first sequence and from said second sequence, in two rounds;

fitting a spline through guide wire center radial rays of remaining images in said first sequence and in said second sequence;

calculating dispersion in said first sequence and in said second sequence, said dispersion being the width of said acoustic shadow cast by said guide wire; and selecting a sequence from one of said first sequence and said second sequence by lowest dispersion value, only if said dispersion value is below an allowed threshold.

61. The method according to claim 59, wherein said procedure of detecting the location of said guide wire in said sequence of IVUS images, comprises the procedures of:

locating the radial ray with a maximum difference between the brightness at the bottom of said radial ray and the standard deviation in the rest of said radial ray, by searching all radial rays of every image in said sequence of IVUS images, resulting in a first sequence of radial rays;

locating the radial ray with a maximum difference between the brightness at the bottom of said radial ray and the standard deviation in the rest of said radial ray, by searching only radial rays of every image in said sequence of IVUS images which fit the profile of a typical guide wire radial ray, resulting in a second sequence of radial rays;

locating the radial distance with a maximum intensity within said found radial ray, for said first sequence and for said second sequence;

locating the radial ray with a nearest local maximum intensity within said found radial distance, for said first sequence;

excluding anomalous images from said first sequence and from said second sequence;

applying a median filter to said first sequence and to said second sequence;

fitting a spline through guide wire center radial rays and excluding outlying images from said first sequence and from said second sequence, in two rounds;

fitting a spline through guide wire center radial rays of remaining images in said first sequence and in said second sequence;

calculating dispersion in said first sequence and in said second sequence, said dispersion being the width of said acoustic shadow cast by said guide wire; and selecting a sequence from one of said first sequence and said second sequence by lowest dispersion value, only if said dispersion value is below an allowed threshold.

62. The method according to claim 59, wherein said procedure of detecting the location of said guide wire in said sequence of IVUS images, comprises the procedures of:

locating the column with a maximum difference between the brightness at the bottom of said column and the standard deviation in the rest of said column, by searching all columns of every image in said sequence of IVUS images, resulting in a first sequence of columns;

locating the column with a maximum difference between the brightness at the bottom of said column and the standard deviation in the rest of said column, by searching only columns of every image in said sequence of IVUS images which fit the profile of a typical guide wire column, resulting in a second sequence of columns;

locating the row with a maximum intensity within said found column, for said first sequence and for said second sequence;

locating the column with a nearest local maximum intensity within said found row, for said first sequence;

excluding anomalous images from said first sequence and from said second sequence;

applying a median filter to said first sequence and to said second sequence;

fitting a spline through guide wire center columns and excluding outlying images from said first sequence and from said second sequence, in two rounds;

fitting a spline through guide wire center columns of remaining images in said first sequence and in said second sequence;

calculating dispersion in said first sequence and in said second sequence, said dispersion being the width of said acoustic shadow cast by said guide wire; and selecting a sequence from one of said first sequence and said second sequence by lowest dispersion value, only if said dispersion value is below an allowed threshold wherein said IVUS images are provided in polar coordinate form, and wherein the horizontal axis of said IVUS images corresponds to the angular dimension.

63. The method according to claim 59, wherein said procedure of identifying regions of calcified plaque in said sequence of IVUS images, comprises the procedures of:

applying a morphological closing operation to every image in said sequence of IVUS images;

assigning tentative calcium pixels based on pixel intensity characteristics, resulting in a binary image of true and false pixels;

applying a morphological dilation operation to said resulting binary image;

determining boundary of calcified plaque regions; and ensuring temporal continuity of said calcified plaque regions.

64. The method according to claim 59, wherein said procedure of identifying regions of calcified plaque in said sequence of IVUS images, comprises the procedures of:

applying a morphological closing operation to every image in said sequence of IVUS images;

assigning tentative calcium pixels based on pixel intensity characteristics, resulting in a binary image of true and false pixels;

applying a morphological dilation operation to said resulting binary image;

determining boundary of calcified plaque regions; and ensuring temporal continuity of said calcified plaque regions.

65. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence to counter various distortions;

performing statistical analysis and spatial integration on said sequence to obtain a classification of blood and tissue regions;

extracting inner boundary of said interior vessel based on said classification of blood and tissue regions;

extracting an outer boundary of said interior vessel utilizing dynamic programming;

wherein said sequence of IVUS images is divided into batches;

detecting stents in each of said batches;

determining borders of said stents in said sequence of IVUS images; wherein said procedure of detecting stents in each of said batches, comprises the procedures of:

applying a morphological closing operation to every image in each of said batches;

partitioning each image into sub-regions and locating pixels with outlying intensities in each of said sub-regions;

assigning tentative stent pixels based on pixel intensity characteristics, resulting in a binary image of true and false pixels;

applying a morphological dilation operation to said resulting binary image;

eliminating falsely identified stent pixels from said binary image;

determining correlation value between consecutive images in each of said batches; and determining if a stent exists in a batch for each of said batches.

66. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence to counter various distortions;

performing statistical analysis and spatial integration on said sequence to obtain a classification of blood and tissue regions;

extracting inner boundary of said interior vessel based on said classification of blood and tissue regions;

extracting an outer boundary of said interior vessel utilizing dynamic programming;

wherein said sequence of IVUS images is divided into batches;

detecting stents in each of said batches;

determining borders of said stents in said sequence of IVUS images; and estimating roll offsets between each pair of consecutive images in each of said batches; and accumulating said roll offsets in said sequence of IVUS images.

67. The method according to claim 66, wherein said procedure of estimating roll offsets is performed based on statistics of the angular component of the motion vectors obtained in said procedure of tracking images in each of said batches to counter various distortions, said motion vectors being the offset between adjacent image frames over a sparse grid of image rectangles.

68. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

wherein said procedure of performing statistical analysis and spatial integration involves calculating statistical properties relating to the intensities of a pixel over a series of said images;

wherein said statistical properties includes properties selected from the list consisting of:

average intensity;

total variation;

number of extrema;

variance;

standard deviation;

skewness; and kurtosis.

69. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

wherein said procedure of performing statistical analysis and spatial integration involves calculating statistical properties relating to the intensities of a pixel over a series of said images; and wherein two histograms are constructed based on said manually traced images, one of said histograms indicating the number of pixels in said manually traced images that have a given value of said statistical properties in the inner layer of said interior vessel, the other of said histograms indicating the number of pixels in said manually traced images that have a given value of said statistical properties in the outer layer of said interior vessel.

70. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

wherein said sequence of IVUS images is divided into batches; and wherein said procedure of identifying bifurcation sectors in each of said batches is based on blood speckles detected linearly along a curve at a constant offset beyond said extracted outer boundary.

71. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

wherein said sequence of IVUS images is divided into batches; and wherein said procedure of identifying bifurcation sectors in each of said batches is performed excluding said detected uninformative regions arising from an acoustic shadow cast by guide wire and by calcified plaque within said interior vessel.

72. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

wherein said sequence of IVUS images is divided into batches; and wherein said procedure of computing said bifurcation regions in said sequence of IVUS images is assisted by bifurcation regions identified via at least one medical imaging modality.

73. The method according to claim 72, wherein said at least one medical imaging modality includes planar or bi-planar fluoroscopic angiography.

74. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel wherein images in said sequence of IVUS images are spatially associated with one another;

extracting an outer boundary of said interior vessel utilizing dynamic programming;

manually editing output of said segmentation in selected images by a user; and wherein said procedure of manually editing output of said segmentation involves integrating manual editing on the detected boundaries in a given image by said user, while adjusting the boundaries in adjacent images to seamlessly integrate said manual editing.

75. The method according to claim 74, wherein said procedure of manually editing output of said segmentation further considers the relative movement of each pixel in a manually edited boundary relative to the original boundary.

76. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

manually editing output of said segmentation in selected images by a user; and wherein said procedure of manually editing output of said segmentation involves integrating manual editing on the detected boundaries in a given image by said user, while adjusting the boundaries in adjacent images to seamlessly integrate said manual editing.

77. The method according to claim 76, wherein said procedure of manually editing output of said segmentation further considers the relative movement of each pixel in a manually edited boundary relative to the original boundary.

78. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel wherein images in said sequence of IVUS images are spatially associated with one another;

extracting an outer boundary of said interior vessel utilizing dynamic programming;

manually editing output of said segmentation in selected images by a user; and wherein said procedure of manually editing output of said segmentation serves as feedback for an additional execution of said segmentation method, by forcing the output at desired locations to be identical to anchor points specified by said user in said manual edited images.

79. A method for performing segmentation of an interior vessel within the body of a patient to detect both the inner boundary and the outer boundary of said vessel, the method comprising the procedures of:

obtaining a sequence of intravascular ultrasound (IVUS) images of an interior vessel;

tracking images in said sequence of IVUS images to counter various distortions;

performing statistical analysis and spatial integration on said sequence of IVUS images to obtain a classification of blood and tissue regions;

extracting inner boundary of said interior vessel based on said classification of blood and tissue regions;

extracting an outer boundary of said interior vessel utilizing dynamic programming;

manually editing output of said segmentation in selected images by a user; and wherein said procedure of manually editing output of said segmentation serves as feedback for an additional execution of said segmentation method, by forcing the output at desired locations to be identical to anchor points specified by said user in said manual edited images.

* * * * *